(12) United States Patent  
Schmidt et al.

(10) Patent No.: US 9,253,588 B2  
(45) Date of Patent: Feb. 2, 2016

(54) VIRTUAL SUBSCRIBER IDENTITY MODULE

(75) Inventors: Andreas U. Schmidt, Frankfurt am Main (DE); Nicolai Kuntze, Darmstadt (DE); Michael Kasper, Mannheim (DE)

(73) Assignee: InterDigital Patent Holdings, Inc., Wilmington, DE (US)

( * ) Notice: Subject to any disclaimer, the term of this patent is extended or adjusted under 35 U.S.C. 154(b) by 963 days.

(21) Appl. No.: 12/168,791

(22) Filed: Jul. 7, 2008

(65) Prior Publication Data

US 2009/0077643 A1    Mar. 19, 2009

(30) Foreign Application Priority Data

Sep. 19, 2007    (DE) .................. 10 2007 044 905

(51) Int. Cl.
| | |
|---|---|
| H04L 29/06 | (2006.01) |
| H04W 4/00 | (2009.01) |
| H04W 8/26 | (2009.01) |
| H04W 12/04 | (2009.01) |

(52) U.S. Cl.
CPC .............. *H04W 4/003* (2013.01); *H04W 8/265* (2013.01); *H04W 12/04* (2013.01)

(58) Field of Classification Search
USPC ...................................... 726/3; 713/153–156
See application file for complete search history.

(56) References Cited

U.S. PATENT DOCUMENTS

| | | | |
|---|---|---|---|
| 6,324,402 | B1 | 11/2001 | Waugh et al. |
| 6,873,609 | B1 | 3/2005 | Jones et al. |
| 6,879,825 | B1 | 4/2005 | Daly |
| 7,252,242 | B2 * | 8/2007 | Ho .................. G06K 19/07 235/487 |
| 2003/0014663 | A1 * | 1/2003 | Sormunen ............. G06F 21/575 713/164 |
| 2003/0187742 | A1 | 10/2003 | Yamagishi |

(Continued)

FOREIGN PATENT DOCUMENTS

| | | |
|---|---|---|
| CN | 1447234 A | 10/2003 |
| CN | 1802647 A | 7/2006 |

(Continued)

OTHER PUBLICATIONS

Zheng, Yu et al., "Trusted Computing-Based Security Architecture for 4G Mobile Networks", 2005, [Retrieved from the Internet Aug. 23, 2011], "http://research.microsoft.com/en-us/people/yuzheng/trusted_computing-based_security_architecture_for_4g_mobile_netw.pdf".*

(Continued)

*Primary Examiner* — Roderick Tolentino  
(74) *Attorney, Agent, or Firm* — Baker & Hostetler LLP

(57) ABSTRACT

A mobile trusted platform (MTP) configured to provide virtual subscriber identify module (vSIM) services is disclosed. In one embodiment, the MTP includes: a device manufacturer-trusted subsystem (TSS-DM) configured to store and provide credentials related to a manufacturer of the MTP; a mobile network operator-trusted subsystem (MNO-TSS) configured to store and provide credentials related to a mobile network operator (MNO); and a device user/owner-trusted subsystem (TSS-DO/TSS-U) configured to store and provide credentials related to user of the MTP. The TSS-MNO includes a vSIM core services unit, configured to store, provide and process credential information relating to the MNO. The TSS-DO/TSS-U includes a vSIM management unit, configured to store, provide and process credential information relating to the user/owner of the MTP. The TSS-DO/TSS-U and the TSS-MNO communicate through a trusted vSIM service.

14 Claims, 12 Drawing Sheets

(56) References Cited

U.S. PATENT DOCUMENTS

| | | | |
|---|---|---|---|
| 2004/0030887 A1* | 2/2004 | Harrisville-Wolff | H04L 63/0442 713/155 |
| 2004/0098350 A1 | 5/2004 | Labrou et al. | |
| 2004/0176134 A1* | 9/2004 | Goldthwaite | G06K 7/0004 455/558 |
| 2005/0045717 A1* | 3/2005 | Rager | G06F 8/67 235/383 |
| 2005/0088999 A1* | 4/2005 | Waylett | H04W 88/10 370/338 |
| 2005/0089168 A1 | 4/2005 | Kahre | |
| 2006/0129848 A1* | 6/2006 | Paksoy | G06F 21/78 713/193 |
| 2006/0242685 A1* | 10/2006 | Heard | G06F 21/577 726/3 |
| 2007/0209065 A1* | 9/2007 | Branam | H04L 63/0815 726/5 |
| 2007/0226805 A1* | 9/2007 | Jeal | G06F 21/12 726/27 |
| 2009/0016685 A1* | 1/2009 | Hudgins | H04B 10/40 385/92 |
| 2009/0125996 A1* | 5/2009 | Guccione | H04L 63/0853 726/6 |
| 2009/0163175 A1 | 6/2009 | Shi et al. | |
| 2010/0210304 A1 | 8/2010 | Huslak | |

FOREIGN PATENT DOCUMENTS

| | | |
|---|---|---|
| CN | 1838170 A | 9/2006 |
| EP | 1 705 610 | 9/2006 |
| JP | 2002-041993 | 2/2002 |
| JP | 2002-281009 | 9/2002 |
| JP | 2005-044325 | 2/2005 |
| JP | 2005-122400 | 5/2005 |
| JP | 2005-518035 | 6/2005 |
| JP | 2006-309729 | 11/2006 |
| WO | 02/058361 | 7/2002 |

OTHER PUBLICATIONS

Kuntze, Nicolai et al., "Trusted Computing in Mobile Action", Jun. 10, 2006, [Retrieved from the Internet Aug. 23, 2011], "http://arxiv.org/ftp/cs/papers/0606/0606045.pdf".*
Bjornstad et al., "Securing Virtual Private Networks with SIM Authentication," Wireless and Mobile Computing, Networking and Communications, 2007. WiMOB 2007. Third IEEE International Conference on Year: 2007, pp. 27-27.*
Kellere et al., "A communication gateway for infrastructure-independent 4G wireless access," Communications Magazine, IEEE Year: 2002, vol. 40, Issue: 3 pp. 126-131.*
Compaq Computer Corporation Net Al., "Trusted Computing Platform Alliance (TCPA) Trusted Platform Module Protection Profile", Version 1.9.7, Prepared for TCPA Membership, (Jul. 1, 2002).
European Telecommunications Standards Institute, "Digital Cellular Telecommunications System (Phase 2+); General Description of GSM Public Land Mobile Network (PLMN) (GSM 01.02)", Version 6.0.1, (Nov. 1998).
Kasper et al., "Subscriber Authentication in Cellular Networks with Trusted Virtual SIMs," 10$^{th}$ International Conference on Advanced Communication Technology, pp. 903-908 (Feb. 17, 2008).
Schmidt, "Lecture 6: The Evolution of Mobile Businesses and the TCG MPWG Specifications", Script for the lecture "Trusted Computomg" given at Techische Universität Darmstadt in the Summer term 2007, (Jul. 4, 2007).
Third Generation Partnership Project, "Technical Specification Group Terminals Specification of the Subscriber Identity Module—Mobile Equipment (SIM—ME) Interface (Release 1999)", 3GPP TS 11.11, V8.13.0, (Jun. 2005).
Third Generation Partnership Project, "Technical Specification Group Terminals Specification of the Subscriber Indentity Module—Mobile Equipment (SIM—ME) Interface (Release 1999)", 3GPP TS 11.11, V8.14.0, (Jun. 2007).
Third Generation Partnership Project, "Technical Specification Group Services and System Aspects; Specification of the GSM-MILENAGE Algorithms: An Example Algorithm Set for the GSM Authentication and Key Generation Functions A3 and A8 (Release 6)", 3GPP TS 55.205, V6.0.0, (Dec. 2002).
Third Generation Partnership Project, "Technical Specification Group Services and System Aspects; Specification of the GSM-MILENAGE Algorithms: An Example Algorithm Set for the GSM Authentication and Key Generation Functions A3 and A8 (Release 6)", 3GPP TS 55.205, V6.2.0, (Mar. 2006).
Third Generation Partnership Project, "Technical Specification Group Services and System Aspects; Specification of the GSM-MILENAGE Algorithms: An Example Algorithm Set for the GSM Authentication and Key Generation Functions A3 and A8 (Release 7)", 3GPP TS 55.205, V7.0.0, (Jun. 2007).
Third Generation Partnership Project, "Technical Specification Group Services and System Aspects; Technical Specifications and Technical Reports for a UTRAN-based 3GPP System (Release 6)", 3GPP TS 21.101, V6.6.0, (Mar. 2007).
Third Generation Partnership Project, "Technical Specification Group Services and System Aspects; Technical Specifications and Technical Reports for a UTRAN-based 3GPP System (Release 6)", 3GPP TS 21.101, V6.7.0, (Jun. 2007).
Third Generation Partnership Project, "Technical Specification Group Services and System Aspects; Technical Specifications and Technical Reports for a UTRAN-based 3GPP System (Release 6)", 3GPP TS 21.101, V6.8.0, (Dec. 2007).
Third Generation Partnership Project, "Technical Specification Group Services and System Aspects; Technical Specifications and Technical Reports for a UTRAN-based 3GPP System (Release 7)", 3GPP TS 21.101, V7.2.0, (Jun. 2008).
Trusted Computing Group, "TCG Mobile Reference Architecture", Specification Version 1.0, Revision 1, (Jun. 12, 2007).
Trusted Computing Group, "TCG Mobile Trusted Module Specification", Specification Version 0.9, Revision 1, (Sep. 12, 2006).
Trusted Computing Group, "TCG Specification Architecture Overview", Specification Revision 1.4, (Aug. 2, 2007).
Trusted Computing Group, "TPM Main Part 1 Design Principles", Specification Version 1.2, Revision 94, (Mar. 29, 2006).
Trusted Computing Group, "Trusted Computing Group", Retrieved from https://www.trustedcomputinggroup.org/home, (2008).
Trusted Computing Group, "Trusted Computing Platform Alliance (TCPA)", Main Specification, Version 1.1b, (Feb. 2002).
Compaq Computer Corporation Net Al., "Trusted Computing Platform Alliance (TCPA) Trusted Platform Module Protection Profile", Version 1.9.7, Prepared for TCPA Memebership, (Jul. 1, 2002).
European Telecommunications Standards Institute, "Digital Cellular Telecommunications System (Phase 2+); General Description of a GSM Public Land Mobile Network (PLMN) (GSM 01.02)", Version 6.0.1, (Nov. 1998).
Schmidt, "Lecture 6: The Evolution of Mobile Businesses and the TCG MPWG Specifications", Script for the lecture "Trusted Computomg" given at Technische Universität Darmstadt in the Summer term 2007, (Jul. 4, 2007).
Schmidt et al., "On the Deployment of Mobile Trusted Modules," IEEE Wireless Communications and Networking Conference, pp. 3169-3174 (Mar. 31-Apr. 3, 2008).
Sharma, "Onboard Credentials: Hardware Assisted Secure Storage of Credentials," Helsinki University of Technology, Department of Computer Science and Engineering, Master's Thesis (Jun. 17, 2007).
Third Generation Partnership Project, "Technical Specification Group Services and System Aspects; Specification of the GSM-MILENAGE Algorithms: An Example Algorithm Set for the GSM Authentication and Key Generations Functions A3 and A8 (Release 6)", 3GPP TS 55.205, V6.0.0, (Dec. 2002).
Third Generation Partnership Project, "Technical Specification Group Services and System Aspects; Specification of the GSM-MILENAGE Algorithms: An Example Algorithm Set for the GSM Authentication and Key Generations Functions A3 and A8 (Release 6)", 3GPP TS 55.205, V6.2.0, (Mar. 2006).
Third Generation Partnership Project, "Technical Specification Group Services and System Aspects; Specification of the GSM-MILENAGE Algorithms: An Example Algorithm Set for the GSM Authentication and Key Generations Functions A3 and A8 (Release 7)", 3GPP TS 55.205, V7.0.0, (Jun. 2007).
Trusted Computing Group, "TCG Mobile Trusted Module Specification FAQ—Technical Overview", TCG Technical Overview Document (Jun. 2007).

* cited by examiner

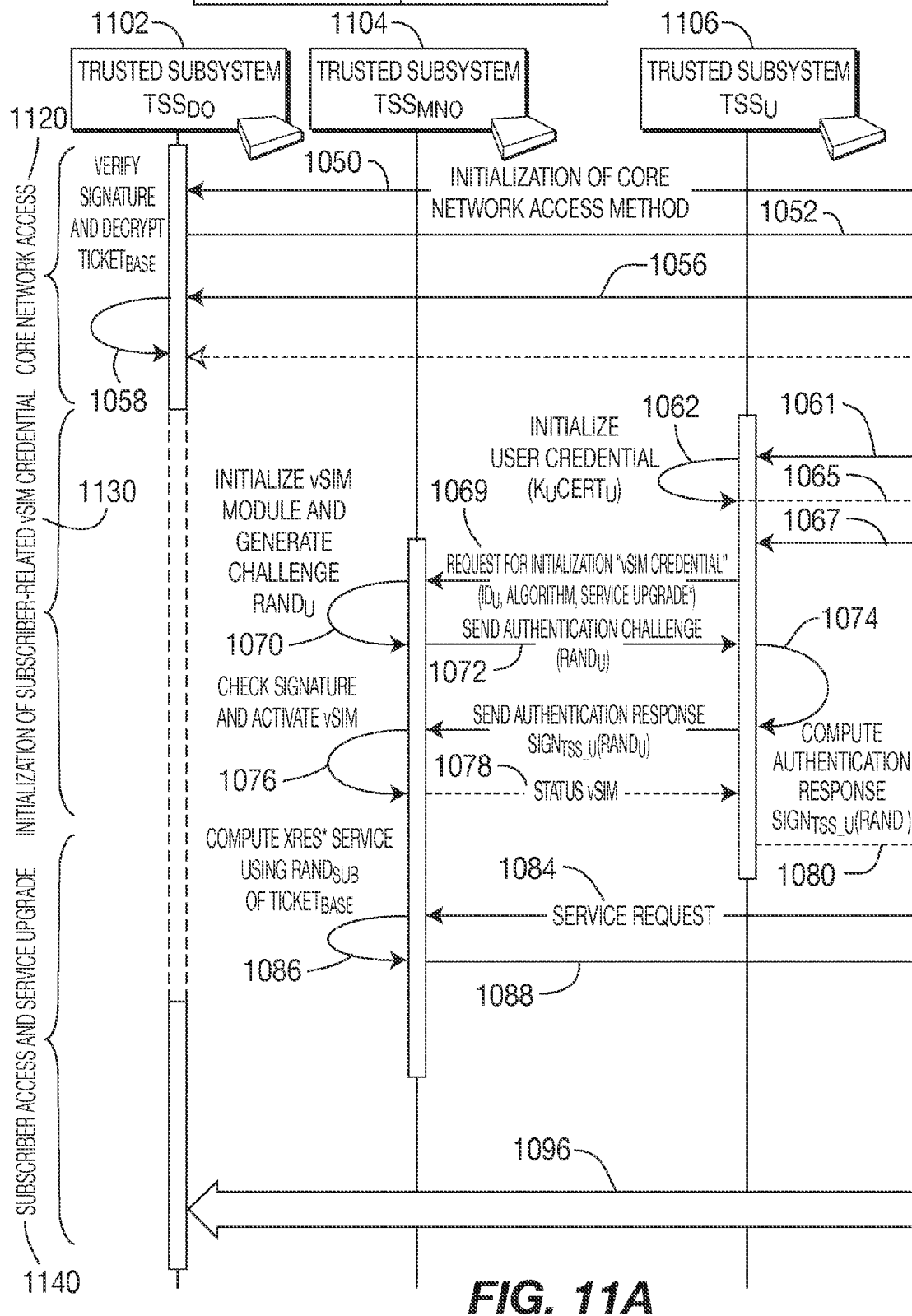

VIRTUAL SUBSCRIBER IDENTITY MODULE

FIELD OF INVENTION

This application is related to wireless communications.

BACKGROUND

With the growing number of wireless communication devices, there is a need to provide a more dynamic solution to the current subscriber identity module (SIM) function carried out within a SIM card or UICC, to overcome some specific shortcomings in relation to modern and evolving mobile communication networks. The UICC provides a secure execution and storage environment from which to execute the SIM authentication algorithms and store credentials. However, the cost of the UICCs, their impractical form factor, and limited functionality prevent them from being used in applications where the mobile network operator may only be known some time after the purchase of the wireless device. Alternatively, the UICC fails when multiple operator networks are to be supported or accessed simultaneously within one device. Methods to update or change mobile network and service subscriptions are limited with SIM cards, and are generally lacking, when over-the-air deployment is desirable.

Furthermore, though the SIM card or UICC is generally considered to be highly secure, this security is not linked strongly to security properties of the whole device on which it resides. This limits the application of scaling security concepts for advanced services and applications such as mobile financial transactions. All of these problems are imminent for autonomous devices connected to mobile networks for instance in machine-to-machine (M2M) communication scenarios.

Accordingly, a more dynamic and concurrently secure software based solution to the SIM function is needed.

SUMMARY

A mobile trusted platform (MTP) configured to provide virtual subscriber identify module (vSIM) services is disclosed. In one embodiment the MTP includes: a device manufacturer-trusted subsystem (TSS-DM) configured to store and provide credentials related to a manufacture of the MTP; a mobile network operator-trusted subsystem (TSS-MNO) configured to store and provide credentials related to a mobile network operator (MNO); and a device owner/user-trusted subsystem (TSS-DO/TSS-U) configured to store and provide credentials related to user of the MTP. The TSS-MNO includes a vSIM core services unit, configured to store, provide and process credential information relating to the MNO. The TSS-DO/TSS-U includes a vSIM management unit, configured to store, provide and process credential information relating to the user of the MTP. The TSS-DO/TSS-U and the TSS-MNO communicate through a trusted vSIM service. Optionally, the MTP may separate the device user and device owner function into a TSS-DO and TSS-U and may include a second TSS-U configured to store and provide credentials relating to a second user of the MTP. Also, the MTP may include a device owner-trusted subsystem (TSS-DO) configured to store and provide credentials related to an owner of the MTP. The MTP may also include a second MNO-TSS configured to store and provide credentials related to a second MNO.

Also disclosed is a procedure for remotely creating a trusted subsystem for use in providing vSIM services.

Also disclosed is a procedure for registering and enrolling a trusted subsystem for use in providing vSIM services.

Also disclosed is a procedure for delivering a trusted subsystem for use in providing vSIM services from a remote location to an MTP.

Also disclosed is a procedure for migrating a trusted subsystem for use in providing vSIM services from a source MTP to a target MTP.

Also disclosed are three related methods for allowing a subscriber using a vSIM configuration to access a wireless network.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, a mobile trusted platform, or any other type of user device capable of operating in a wireless environment. When referred to hereafter, the terminology "base station" includes but is not limited to a Node-B, a site controller, an access point (AP), or any other type of interfacing device capable of operating in a wireless environment. The term "trustworthiness" is regarded as a standard which describes the status of an application and/or service. This status signifies that an application and/or service can directly or indirectly provide an indication of its integrity and correct functioning.

Figure 1:
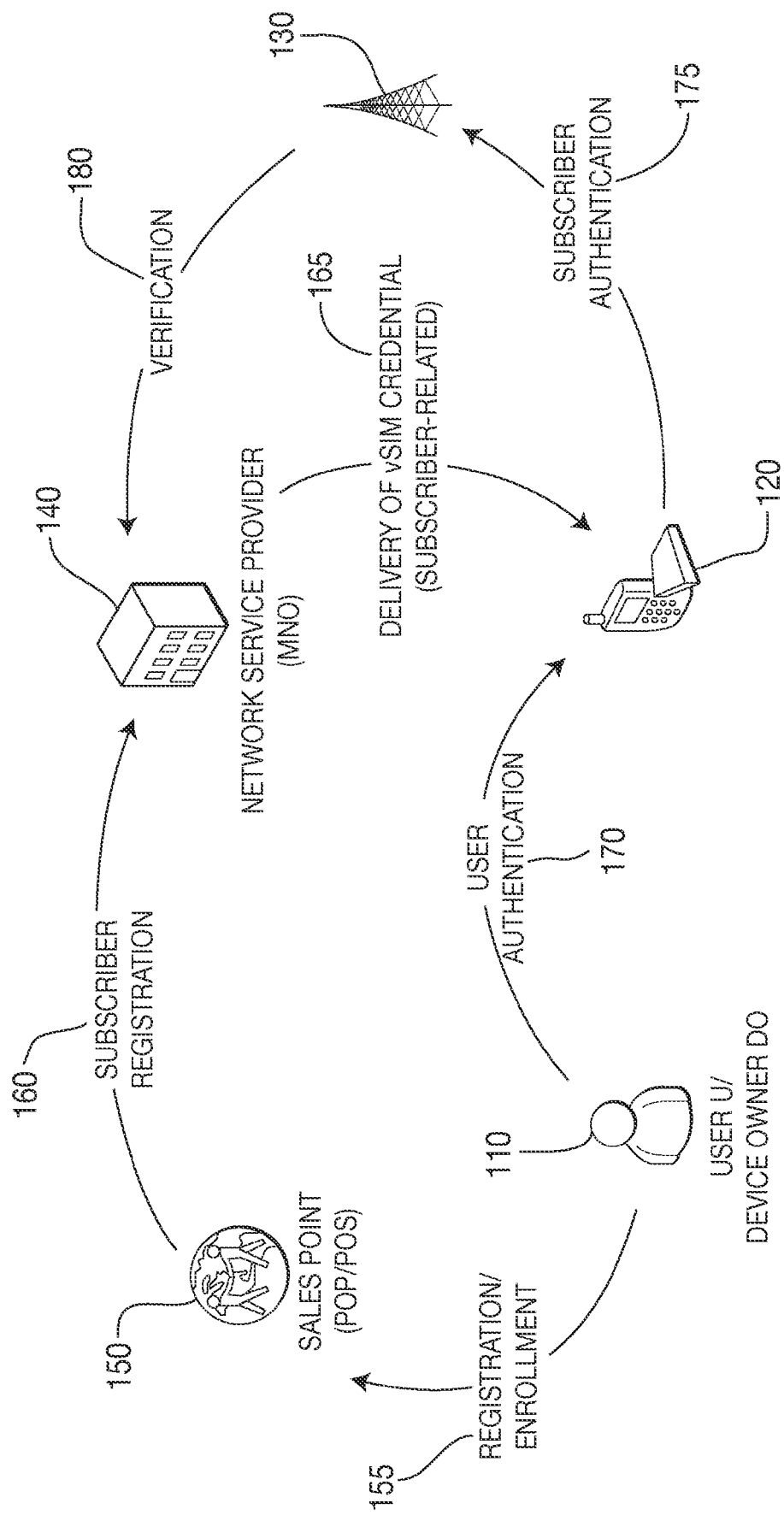
FIG. 1 shows an example of a communication system architecture configured to use services and determine subscriber identity using a software based virtual subscriber identity module (vSIM)

FIG. 1 shows an example of a communication system architecture configured to use services and determine subscriber identity using a software based virtual subscriber identity module (vSIM). The communication system 100 includes a user or device owner (DO) 110, a trusted mobile platform 120, a base station 130, a network service provider (MNO) 140, and point of sale (POS) 150. The DO 110 communicates with the POS for the purpose of registration and enrolment 155 with the POS 150. The POS 150 communicates with the MNO 140 in order to perform subscriber registration 160. The MNO 140 communicates with the trusted mobile platform to deliver the vSIM credential 165. The DO 110 provides information to the trusted mobile platform 120 in order to authenticate 170 the user. The trusted mobile platform then sends the subscriber authentication 175 to the base station 130. The base station 130 then communicates with the MNO 140 to verify the user authentication information.

In general the vSIM architecture of FIG. 1 is protected by a trusted operating system which is based on a permanently assigned trusted anchor and which supports multiple separate and trusted execution environments or sub systems. As shown, one execution environment is assigned to a specific stakeholder, and additional stakeholders beyond those pictured would be possible.

The architecture shown in FIG. 1 takes four important entities into account. In this scenario, the DO/U intends to establish a long-term relationship with the MNO in order to use a mobile communications network and the services offered therein (for example, GSM, UMTS telephone, data services, or specialized location-based services).

Instead of using a physically present SIM card, the MNO provides the MTP with a software-based access authorization credential or vSIM credential. The vSIM credential is composed of a subscriber-related portion and a user-related portion. Every time that a registered device user must be initially authorized by the communications network, they are first authenticated for the vSIM service via the user-related portion of the vSIM credential. In the course of the communication relationship, this service uses the subscriber-related portion of the vSIM credential for network authentication.

Figure 2:
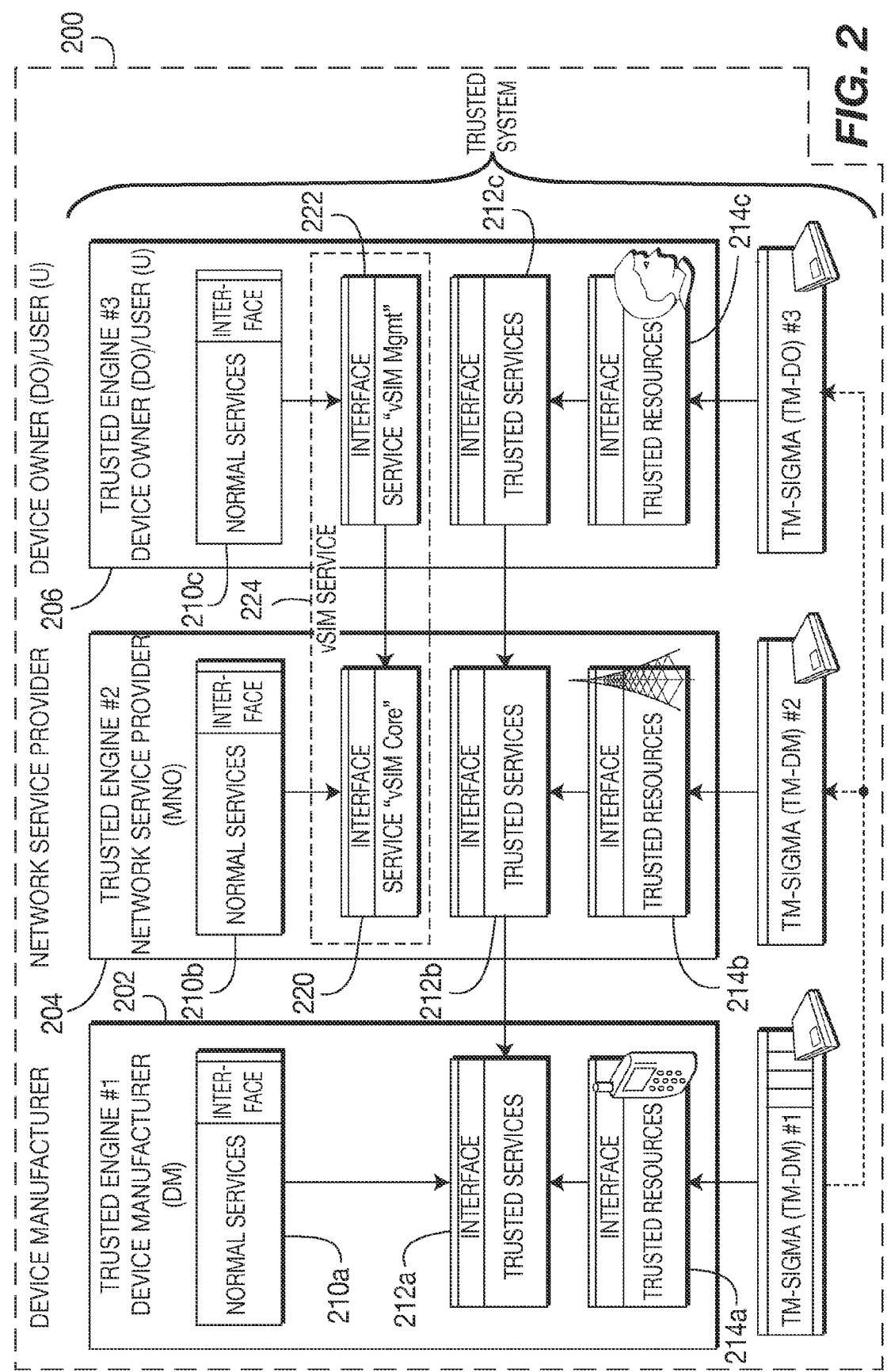
FIG. 2 shows an example of a vSIM architecture for a single user mobile trusted platform.

FIG. 2 shows an example of a vSIM architecture for a single user mobile trusted platform (MTP) 200. The mobile trusted platform 200 includes three separate trusted sub systems (TSSs) 202, 204, 206. The first TSS 202 is allocated to the device manufacturer (DM). The second TSS 204 is allocated to the network service provider (MNO). The third trusted TSS 206 is allocated to the DO 206. It should be noted that TSS-DO may also be allocated to the user (TSS-U). Each of the three TSSs 202, 204, 206 includes a normal services unit 210a, 210b, 210c, a trusted services unit 212a, 212b, 212c, and a trusted resources unit 214a, 214b, 214c. The MNO trusted TSS 204 also includes a vSIM core unit 220, for performing the SIM functions related to the MNO. The DO trusted TSS 206 also includes a vSIM management unit 222 for performing the SIM functions related to the DO. The vSIM core unit 220 and the vSIM management unit 222 communicate through a trusted link 224 and combine to perform at least the functions of a conventional universal subscriber identity module (USIM).

Figure 3:
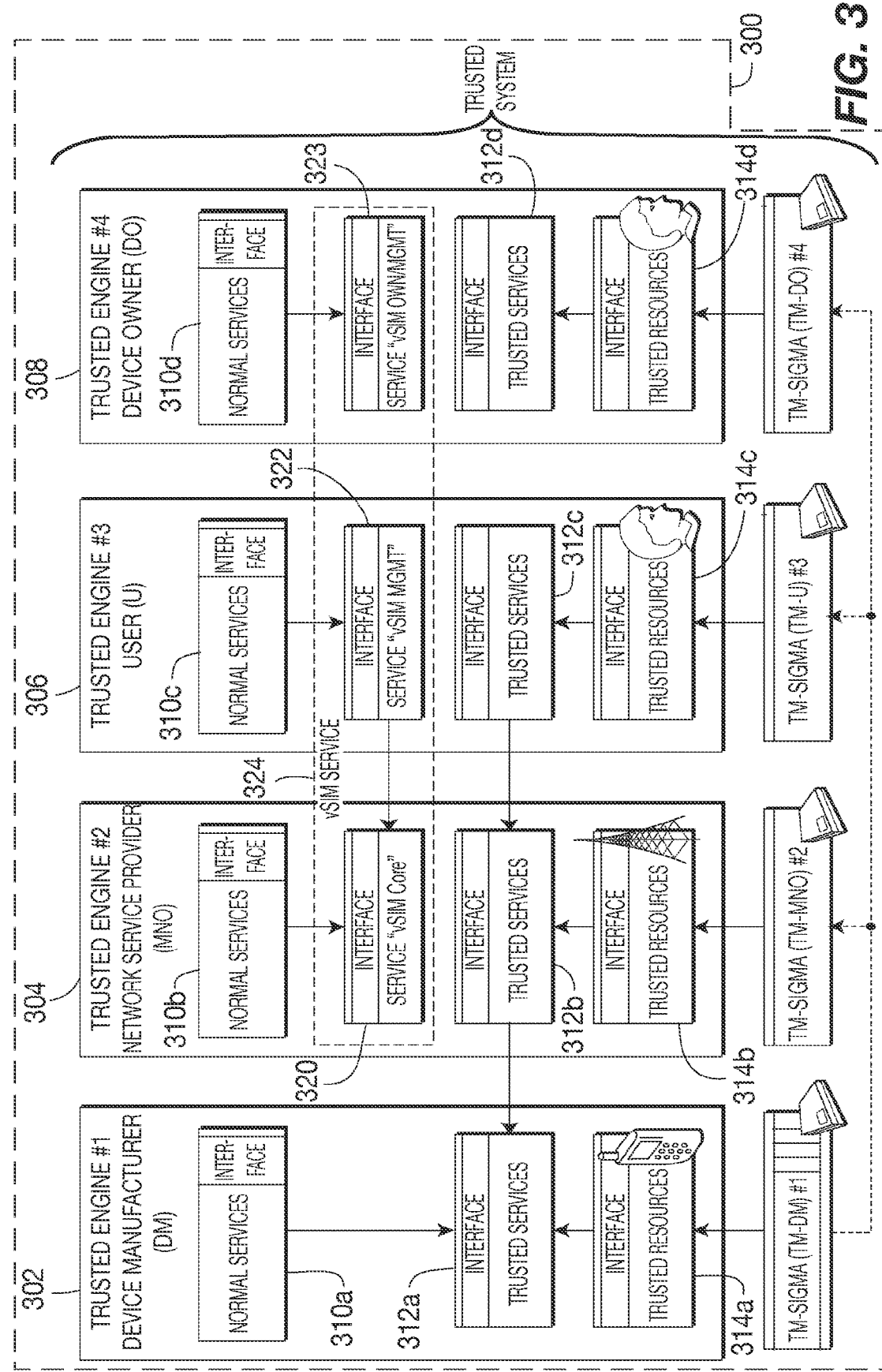
FIG. 3 shows an example of a vSIM architecture 300 for a multi user mobile trusted platform.

FIG. 3 shows an example of a vSIM architecture 300 for a multi user MTP 300. The mobile trusted platform 300 includes four separate TSSs 302, 304, 306 and 308. The first TSS 302 is allocated to the device manufacturer (DM). The second trusted TSS 304 is allocated to the network service provider. The third TSS 306 is allocated to a first user. The fourth TSS 308 is allocated to the device owner 308. Each of the four TSSs 302, 304, 306 and 308 includes a normal services unit 310a, 310b, 310c, 310d, a trusted services unit 312a, 312b, 312c, and a resources unit 314a, 314b, 314c. The MNO TSS 304 also includes a vSIM core unit 320, for performing the SIM functions related to the MNO. The user TSS 306/308 also includes a vSIM subscriber management service 322/323 that performs functions pertaining administration and authentication of local users. More specifically this service provides an authentication oracle to the vSIM core service 320 such that evidence is given as to a local user's identity. The vSIM core unit 320 and the vSIM management unit 322 communicate through a trusted link 324 and combine to perform at least the functions of a conventional universal subscriber identity module (USIM).

In general, MTPs 200 and 300 support multiple protected, separate execution environments. Each environment represents an area associated with a stakeholder. The MTPs 200 and 300 are configured to implement a vSIM service which replaces the conventional smart card-based SIM card and its function. In general, the vSIM service extends to (at least) three different execution environments as is shown in FIG. 2, however, it maybe extended to support numerous other execution environments, which is shown by example in FIG. 3.

As shown in FIGS. 2 and 3, several different stakeholders (sigma) are considered: the device manufacturer (DM), the network access and service provider (mobile network operator, MNO), the device owner (DO), and the user (U). A trusted subsystem TSS-sigma is configured as a logical unit comprising the trusted execution environment (TE-sigma) and the non-exchangeable security module (trusted module, TM) or the entity of the security module (TM-sigma) associated with the remote owner (RO) or stakeholder (sigma). A TSS-sigma is always configured to sign and encrypt any given data. A TSS-sigma has access to a trusted service RTV-sigma. This service is responsible for verification, for example of defined system states based on reference data. Various other trusted subsystems of a similar architecture proposed herein are described below by way of example. These include the subsystems TSS-DM 202 & 302, TSS-MNO 204 & 304, TSS-DO 206 & 306, and TSS-U 206 & 308 of stakeholders DM, MNO, DO, and U.

The TSS-DM 202 & 302 is responsible for the integrity, configuration, and installation of the device together with its installed hardware components. It provides all security-sensitive resources for a device. The TSS-DM 202 & 302 generally controls all internal and external communications and secures the communications channel. Consequently, all protocol messages of a TSS-sigma are transmitted by the communications services of the TSS-DM 202 & 302 for the destination point thereof.

All subscription-dependent and subscriber-related network provider services of a platform are allocated to the TSS-MNO 204 & 304. This subsystem is responsible for managing and protecting the subscriber-related portion of the vSIM credential, and performs the client-side network authentication of a subscriber. The subsystem provides the vSIM core service (vSIM-CORE) for this purpose. The vSIM-CORE 220 & 320 is configured to substitute essential functions (subscriber authentication) for the conventional SIM, but may also accommodate other authentication features. The term "trusted subsystem TSS-MNO" is synonymous with a fully equipped TSS-MNO which provides the necessary vSIM-CORE service 220 & 320. A combination of TSS-DM and TSS-MNO is also possible. It should also be noted that the vSIM core service is responsible for the secure storage and use of subscriber data as well as the subscriber authentication with the MNO.

The TSS-U 206 & 306 protects all user-related and private information, in particular the user's associated access authorization credential (user-related portion of the vSIM credential). The TSS-U 206 & 306 instantiates the vSIM management service (vSIM-MGMT) 222. This service is responsible for management of user information and for computation of authentication responses for the local user. The service vSIM-MGMT provides the service vSIM-CORE with an internal authentication oracle. vSIM-MGMT is thus able to provide proof of identity of the local user after authentication inquiries. This service is responsible for the user management of a vSIM, in particular for the administration and management of a device user. The owner management service vSIM-OwnMGMT in vSIM is functionally imaged in vSIM-MGMT. It should also be noted that any TSS-U is able to generate suitable cryptographic keys which may be accessed and used only by the intended platform user U for a digital signature.

The TSS-DO 206 & 308 instantiates the vSIM owner management service (vSIM-OwnMgmt). This service is responsible for managing owner information and for administrative management, such as for local users or service providers. TSS-DO and TSS-U may also be combined into one for single-user systems as shown in FIG. 2.

The MTP in general, is a mobile platform having a non-exchangeable security module (trusted module, TM) permanently associated with the hardware platform. In the context of the vSIM architecture under consideration, the MTP is not mandatorily provided with a conventional security token for subscriber authentication such as a conventional SIM card. The MTP operates a trusted operating system. The trusted software layer supports multiple separate trusted subsystems (TSS_SIGMA) with a protected and insulated execution and memory function.

Each trusted subsystem (TSS_SIGMA) is used for critical security functions for a stakeholder. The trusted subsystem is composed of a trusted entity of the security module (TM-SIGMA) and an associated trusted execution environment (trusted engine, TE_SIGMA), and trusted services (TS_SIGMA). At least the three trusted subsystems TSS-DM, TSS-MNO, TSS-U on behalf of the remote owners DM, MNO, U exist on an MTP. The procedures are described for a single-user system. The device owner DO and the function of the TSS-DO are imaged for U or TSS-U.

It should be noted that, the MNO directly or indirectly provides the necessary functions of a public key infrastructure. The MNO possesses a certificate Cert-MNO which has been issued by a certification authority CA. This certificate links the identity of the MNO to the public key K-pub-MNO, which is necessary for checking digital signatures. This certificate is available to the MTP and all embedded services.

It is noted that the procedures described below consider a single-user system for purposes of example only. As a result, the device owner DO is made equivalent to the user U. As shown in FIG. 3, the methods for subscriber authentication in multiple-user systems with separate TSS-DO and TSS-U, are carried out in an analogous manner, and would be within the scope of this application. Other multi-user scenarios are possible, for example: (1) one TSS-U and multiple TSS-MNOs; (2) one TSS-MNO and multiple TSS-Us; and (3) multiple TSS-Us and multiple TSS-MNOs. To avoid the circumvention of ownership control, only one DO is permissible in any such configuration. In the various multi-user scenarios the vSIM-MGMT service, as it applies to the DO only, is configured to straddle and be compatible with all users as well as multiple vSIM-CORE service manifestations. Hence for a single user, the vSIM-MGMT service is separated into a vSIM-MGMT-DO and vSIM-MGMT-U function. This is advantageous in application scenarios where for instance a group of users (e.g., a family) would use the same MNO subscription, or, on the other hand, when a single user would want to choose from more than one MNO subscription depending on circumstances, for instance when being abroad. The preferred method to implement them is that either vSIM-CORE and/or vSIM-MGMT hold secured databases including authorization secrets of the respective other services in the respective other TSS to establish the desired 1 to n, n to 1, or n to m relationship between the respective TSS and between the various vSIM-MGMT and vSIM-OwnMgmt.

The proposed vSIM architectures of FIGS. 2 and 3 assume security characteristics that are equivalent to conventional architectures for subscriber authentication based on conventional security tokens. In particular, these architectures assume the protected storage function, a separate tamper-protected execution environment, and authentication of a user. A vSIM platform must also ensure that only authorized subjects are able to access or manipulate protected data of the vSIM credential. This is particularly important while this data is: in transit to the vSIM execution environment or to other trusted services; stored in the volatile or nonvolatile memory of the MTP; executed or used within the execution environment; or transferred between various trusted environments by authorized subjects. This includes the feature of an attacker that is not able to destroy or modify security-sensitive data, or circumvent the access control mechanisms. The system must also prevent loss and escape of security-sensitive data, and ensure that all necessary services are available and functional. In particular, the vSIM architecture must ensure that authorized subjects are able to access security-sensitive services only through appropriate (local or remote) owners.

Figure 4:
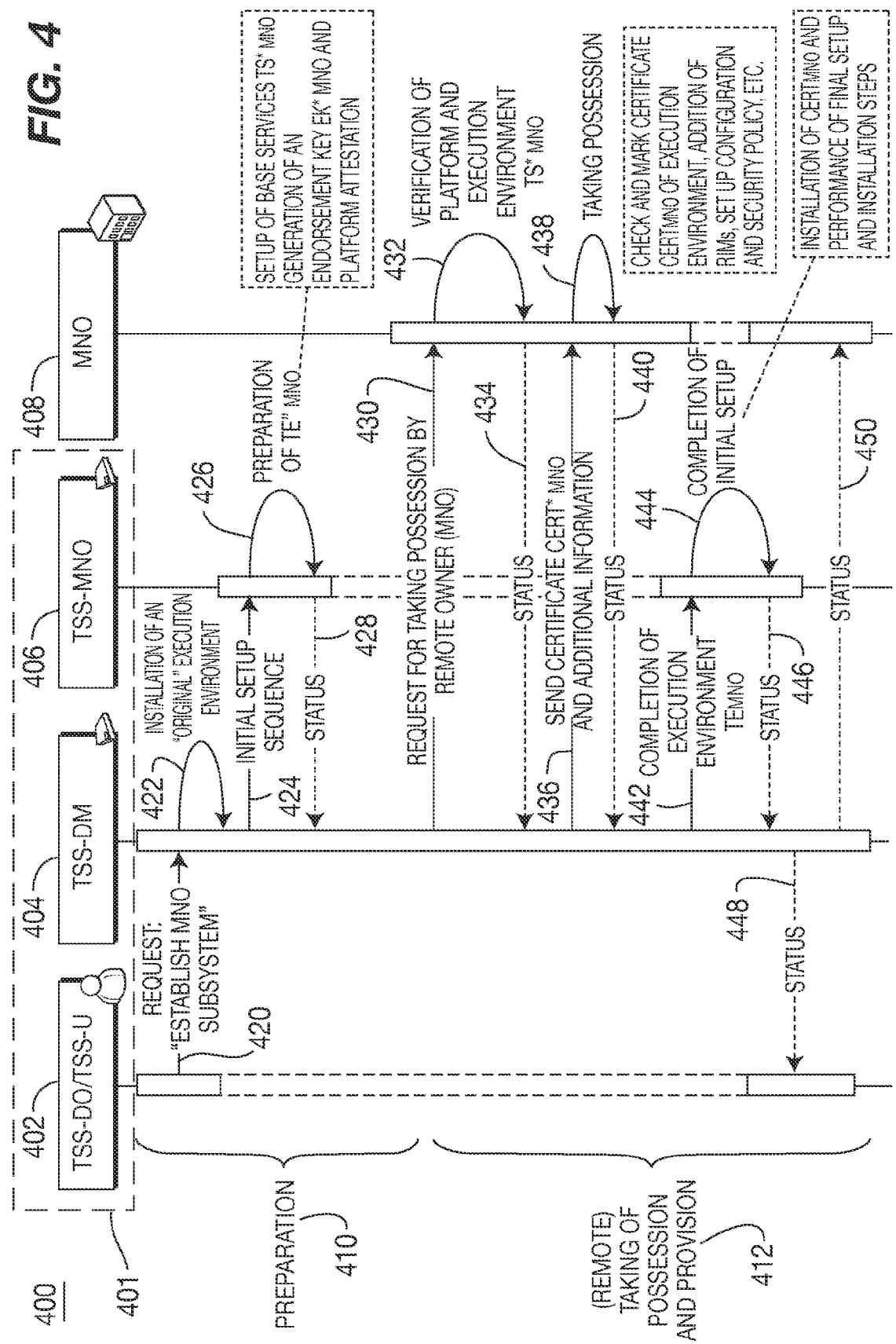
FIG. 4 shows a procedure for installing a TSS-MNO on a pristine mobile trusted platform.

FIG. 4 shows a procedure 400 for installing a MNO-TSS 406 on a pristine mobile trusted platform 403 having a TSS for the device manufacturer (TSS-DM) 404 and TSS for the user (TSS-U) 402 in communication with an MNO 408. It should be noted that the term TSS-MNO is used to refer to both the trusted subsystem established by this procedure and also the trusted execution environment (TE) MNO (TE-MNO) which will become the TSS-MNO at the end of the procedure. The taking of possession by a remote owner (RO) establishes the fundamental and elementary relationship of trust between the remote owner or stakeholder and the MTP. The procedure requires that an empty or pristine execution environment exists. The first part of the procedure 410 is dedicated to preparing the empty execution environment, while the second part 412 is dedicated to remotely taking ownership of the newly created trusted engine (TE). The pristine TSS-MNO (TSS*-MNO) is composed of a pristine standard execution environment (TE*-MNO) having a base functionality and/or a number of trusted services. When the subsystem TSS*-MNO is able to provide the MNO with proof of its untouched configuration, structure, and conformity regarding its security policy, it is certified by the MNO.

The preparation part 410 of the procedure 400 begins when the TSS-U 402 sends a request to establish a TSS-MNO to the TSS-DM 404 at 420. The TSS-DM 404 then installs an original execution environment at 422. Then the TSS-DM 404 sends the initial set up sequence to the newly created TE*-MNO, at 424. An "empty" execution environment TE*-MNO is established, and a new entity of the security module TM-MNO 406 is activated or created, at 426. In addition, a pristine execution environment TE*-MNO is established and prepared. In particular, an endorsement key pair EK*-TSS-MNO together with a corresponding endorsement certificate Cert-TSS-MNO is created within the TE*MNO. The TSS-MNO 406 sends a status message back to the TSS-DM 404, at 428.

The remote take ownership part 412 of the procedure 400 begins when the TSS-DM 404 sends a request for taking possession by remote owner (MNO) message to the MNO 408, at 430. The MNO 408 then performs verification of the trusted mobile platform 401 and the execution environment TS-MNO 406, at 432. Next the MNO 408 sends a status message to the TSS-DM 404 at 434. Next, the TSS-DM 404 sends a certificate CERT_MNO and additional information to the MNO 408, at 436. Then the MNO 408 checks and signs the certificate CERT_MNO and sets up a configuration and security policy, at 438. The MNO 408 sends a status message to the TSS-DM 404, at 440. Then the TSS-DM 404 sends a completion of execution environment TSS-MNO 406 to the TSS-MNO 406. Next, the TSS-MNO completes the initial set up by installing the CERT_MNO and performing a final set up and installation procedure, at 444. Then the TSS-MNO 406 sends a status message back to the TSS-DM 404, at 446. The TSS-DM 404 forwards a status message along to the TSS-DO 402, at 448. The TSS-DM 404 also sends a status message to the MNO 408, at 450.

While FIG. 4 describes a specific implementation of a remote take ownership procedure, the following description describes a more general procedure with a similar end point as the procedure in FIG. 4. A device owner (DO) of an MTP must be able to purchase an "empty" communications terminal, such as a mobile telephone, that has not been pre-allocated and initialized by a specific MNO so that the user U or the device owner DO may freely choose any given MNO without restrictions. The procedure of FIG. 4 is used to perform the taking possession of the TSS-MNO by a remote owner and to complete establishment of the vSIM execution environment by the MNO. It should be noted that the method may be directly transferred to any given remote owner, and is not restricted to the MNO.

The TE*-MNO then attests its current status. The attestation may be performed by the local verifier RTV-DM of the TSS-DM, using reference values (RIM) and corresponding certificates of the remote owner MNO. Note that the RIM corresponding to TE*-MNO (a trusted engine in a pristine state) may not necessarily be associated with a particular MNO and may have no more configuration beyond an initial base functionality. If no matching RIM and/or corresponding RIM certificate is available for the execution environment, the certification may be performed using an external (accepted) verification entity. The attestation $ATTEST(S_i)$ is signed by the RTV signing identity (RTVAI).

$$TE^*_{MNO} \rightarrow MNO:ATTEST(S_i) \quad \text{(Equation 1)}$$

The TE*-MNO generates a symmetrical session key Ks and uses it to encrypt the public portion of the endorsement key EK*-TSS-MNO, the corresponding certificate Cert-TSS*-MNO, the certification data, and information about the intended purpose. The TE*-MNO then encrypts the session key Ks together with the public key K-pub-MNO and sends both messages to the MNO. Without loss of generality, the TE*-MNO may use an attestation identity key AIK*-TSS-MNO instead of the endorsement key EK*-TSS-MNO and a corresponding certificate Cert-TSS*-MNO, certification data, and information about the intended purpose.

It is assumed that this key K-pub-MNO is either publicly available or is preinstalled by the device manufacturer.

$$TE^*_{MNO} \rightarrow MNO:ENK_{Ks}(\{EK^*_{MNO}, Cert^*_{TSS_{MNO}}, \ldots\}), ENC_{MNO}(K_s) \quad \text{(Equation 2)}$$

The attestation (equation 1) and the EK*-TSS-MNO and its certificate as well as the session key Ks that encrypts it (equation 2) may be transmitted separately but in the same session (i.e. bounded by the same session nonce). Alternatively, the transmission could be done at once, using the same session key Ks, hence in this case:

$$TE^*_{MNO} \rightarrow MNO:ENK_{Ks}(\{EK^*_{MNO}, Cert^*_{TSS_{MNO}}, \ldots\}, ATTEST(S_i)), ENC_{MNO}(K_s) \quad \text{(Equation 3)}$$

After the MNO has received the messages, they are decrypted using the private portion of the asymmetrical key K-pub-MNO.

In the subsequent step the MNO verifies the certification data and checks the intended purpose of the TSS*-MNO. If the data for the execution environment and the device certification are valid and the intended purpose is accepted, the MNO produces an individual security policy SP-MNO. The MNO signs the Cert-TSS-MNO and generates RIM values and RIM certificates for a "complete" TSS-MNO, which is configured to operate with a particular service provider. These are necessary for local verification of the TSS-MNO.

The MNO also generates an initial configuration SC-TSS-MNO. This is used to individualize the execution environment or to complete same with regard to the intended purpose and the particular security policy. The individualization generally includes software not initially present to enable appropriate functionality. The RIM and RIM certificate are generated to reflect this initial configuration. In the next step the MNO encrypts the messages using the public portion of the key (EK-pub-TSS-MNO), and transmits this packet to the TE*-MNO, which can in particular be performed via the base network connection provided by TSS-DM. Note that SP-TSS-MNO and SC-TSS-MNO are MNO-specific and the TSS-MNO's expected 'post-completion' state that corresponds to the SP-TSS-MNO and SC-TSS-MNO needs to be defined by a new RIM certificate.

$$MNO \rightarrow TSS_{MNO}:ENC_{TSS_{MNO}}(\{SP_{MNO}, SIGN_{MNO}(Cert_{TSS_{MNO}}), RIM_{TSS\text{-}MNO}, SC_{TSSMNO}\}) \quad \text{(Equation 4)}$$

The execution environment TE*-MNO decrypts the received packet and installs it within the TSS-MNO. Lastly, the establishment is completed based on the configuration SC-TSS-MNO. This means in particular that all services not yet installed and which are required by the SC-TSS-MNO are introduced or installed in the TSS-MNO.

Figure 5:
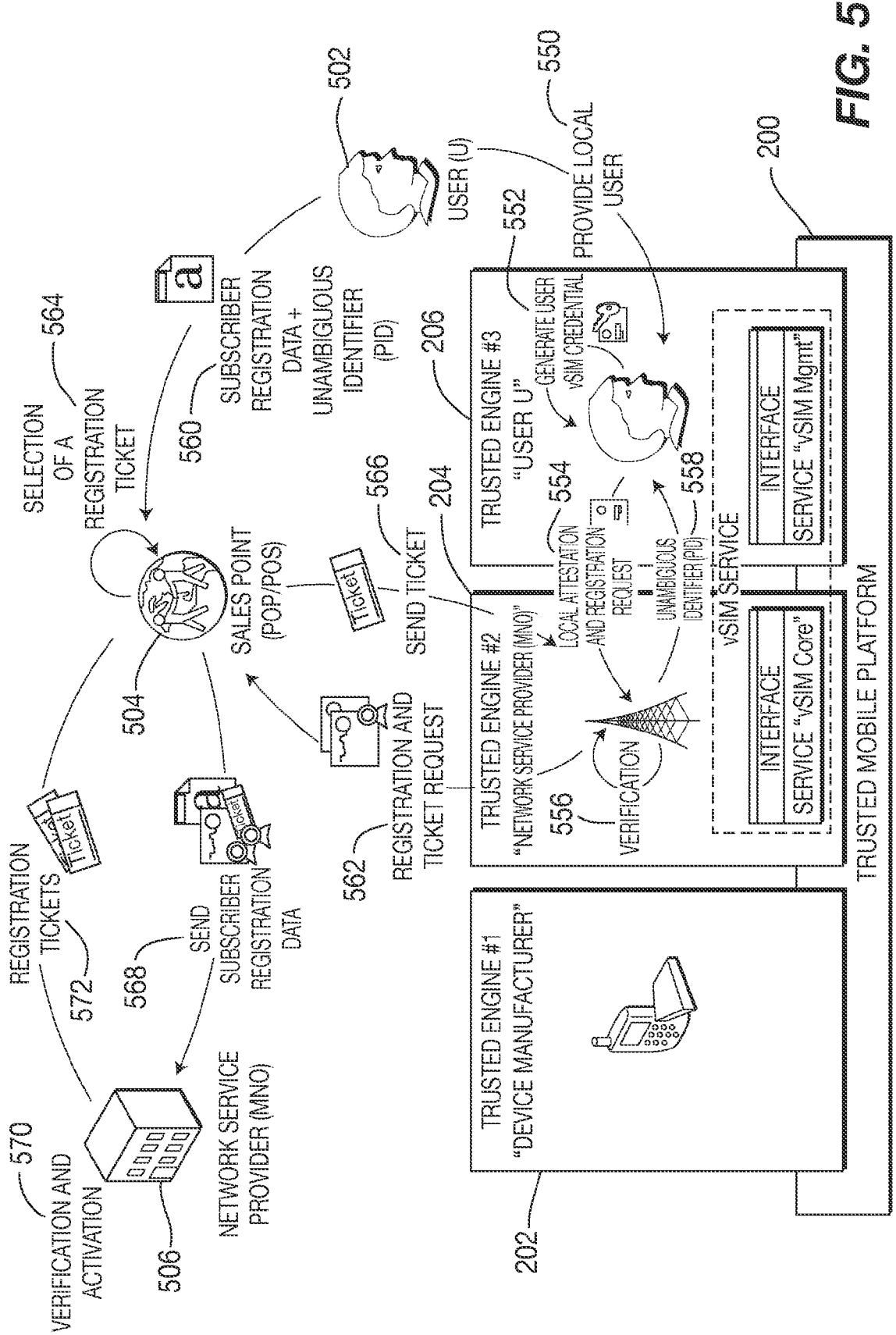
FIG. 5 shows a procedure for subscriber registration and delivery of the vSIM credential.

The procedure for subscriber registration and delivery of the vSIM credential is shown in FIG. 5, and described below. To make use of the vSIM service, an access authorization credential (vSIM credential) must be available to the MTP 200. This vSIM credential is either (1) generated by the MNO 506 and installed by the MNO or DM beforehand, (2) is based on initially secret information, used to install the vSIM credential or (3) is generated (by the MNO 506 and the user U 502) during the take ownership process.

Since the services of the vSIM architecture are implemented as trusted software applications, the respective subscriber-related portion of the vSIM credential must be securely transmitted by the MNO to the vSIM service. In conventional SIM-based systems the subscriber receives a security token (smart card/SIM card) directly after being registered. In contrast to the vSIM credential, this security token physically exists and is delivered with a pre-installed key or SIM credential for the respective POS.

In a preparatory phase (not shown) the MTP 200 has executed a certified initial startup procedure and has loaded a specific trusted software layer of the OS and its trusted units. This includes the trusted execution environments together with their embedded services vSIM-CORE and vSIM-MGMT. The trustworthiness of the platform has been checked, and the installed hardware and running software are in a trusted, acceptable, and plausible status and configuration. The platform is thus in a state that is described as 'having achieved a secure boot' with a vSIM function installed. Additionally, upon request, the platform is also able to report this status through an authorized entity and to certify the status.

The POS 504 orders any given number of previously generated registration tickets Ticket-i from the MNO 506. A registration ticket is composed of the triplet:

$$\text{Ticket}_i := \{\text{IMSI}_i, \text{RAND}_i, \text{AUTH}_i\} \quad \text{(Equation 5)}$$

IMSI-i stands for an international mobile subscriber identity. Alternatively, this may be a random, unambiguous identifier (ID) that is assigned by the authorized center or an ID that signifies the ID of a service subscriber for whom the service is provided through the communication network. In case IMSI-i is an IMSI, such tickets can be distinguished by their unique indices.

The term RAND-i stands for a random value. This value is necessary for checking the identity of the TSS-MNO 204 during the protocol. By use of AUTH-i the MTP 200 is able to check the integrity and authenticity of the ticket-i. AUTH-i is a signature of the MNO 506 signed by a private key of the MNO 506. By decrypting AUTH-i the POS 504 can identify the MNO 506 that originated the Ticket-i. The authentication of the POS 504 by the MNO 506 is not considered in the protocols described herein but it is considered sufficiently trustworthy to take possession of and dispense tickets.

If multiple pristine trusted subsystems (TE*-MN0s) with their own roots of trust are installed by the DM it is then possible for the MNO 506 to take ownership of these subsystems separately and thereby regard each as a distinct device. In this scenario multiple users can register via these separate subsystems on a one-to-one basis.

It should also be noted that the registration procedure described in FIG. 4 is distinct from the registration procedure of FIG. 5, as well as subsequent protocols described in this patent application. Therefore the procedure of FIG. 5 does not require the use of a particular take-ownership procedure.

The user registration and the vSIM credential roll-out procedure are separated into two phases. The following procedure is illustrated in FIG. 5, and describes the first phase. The user registration and registration for subscriber-related services of the MNO 506 are specified in the first phase.

The user starts the protocol by requesting a new identity credential (user-related portion of the vSIM credential) for a local user for the TSS-U/DO 206, which is generated by same. For this purpose the local user submits a unique identity code ID-U, his personal registration data REGDATA-U, and a secret authorization password CHV-U to the trusted service vSIM-MGMT at 550. The use of the unique ID-U eliminates the possibility that the same user (U) 502 can use different ID-U's to register the same platform to the same MNO 506 for vSIM user registration purposes. The information shown in Equation 6 originates at the POS 504, some of which is generated by the user 502 (probably REGDATA-U and CHV-U) and some (ID-U) by the POS 504 itself.

$$U \rightarrow \text{vSIM}_{MGMT}: \text{ID}_U, \text{CHV}_U, \text{REGDATA}_U \quad \text{(Equation 6)}$$

vSIM-MGMT then generates an asymmetrical signature key pair K-U and generates a corresponding certificate which includes all of the user's relevant information (REGDATA-U, the public portion of K-U), at 552. The service vSIM-MGMT then transmits the certificate CERT-U and an attestation, signed by the private portion of K-U, to the service vSIM-ECORE, at 554. Within the scope of a trusted environment it is assumed that a secure link is established between the vSIM-MGMT and vSIM-CORE.

$$\text{vSIM}_{MGMT} \rightarrow \text{vSIM}_{CORE}: \text{ATTEST}(S_i), \text{CERT}_U \quad \text{(Equation 7)}$$

At this point, the service vSIM-MGMT initiates a registration procedure and certifies its current status and configuration to the local verifier (RTV-MNO) of the services vSIM-CORE. The TSS-MNO 204 checks the provided data based on the reference data. The TSS-MNO 204 then checks whether the status of the current execution environments is in a valid and acceptable state. The certified asymmetric key pair K-U serves as means by which the attestation of the current execution environment is verified, at step 556. As soon as the vSIM-CORE determines the reliability of the device, it generates an unique identifier PID and sends this value to the vSIM-MGMT 558.

$$\text{vSIM}_{CORE} \rightarrow \text{vSIM}_{MGMT}: \text{PID} \quad \text{(Equation 8)}$$

The user transmits the registration data REGDATA-U (for example, name, address, accounting information, personal identification number) and the PID to the POS over what is considered to be a secure channel, where encryption is performed if necessary, at 560. The service vSIM-CORE initiates a registration procedure for the user U 502. For this purpose vSIM-CORE signs its own certificate and the received user certificate. vSIM-CORE then sends this packet to the POS 504.

$$U \rightarrow \text{POS}: \text{PID}, \text{REGDATA}_U \quad \text{(Equation 9a)}$$

$$\text{vSIM}_{CORE} \rightarrow \text{POS}: \text{CERT}_{TSS\_MNO}, \text{CERT}_{U\,tm\,(Equation\ 9b)}$$

$$\text{vSIM}_{CORE} \rightarrow \text{POS}: \text{SIGN}_{TSS_{MNO}}(\text{PID}, \text{CERT}_{TSS\_MNO}, \text{CERT}_U) \quad \text{(Equation 9c)}$$

After the POS 504 has received the request, it selects a ticket-i, binds it to the key K-pub-TSS-MNO 204, at 564 and sends it back to the TSS-MNO 204, at 566. The PID provides a handle by which the user is uniquely identified with the ticket. Also, the POS 504 is able to use the PID to associate the user with the registration request being made by the vSIM-CORE. In this case the POS 504 may be any given point of sale accredited by the MNO, such as an Internet portal.

$$\text{POS} \rightarrow \text{TSS}_{MNO}: \text{BIND}_{TSS_{MNO}}(\text{Ticket}_i) \quad \text{(Equation 10)}$$

As soon as the POS 504 has determined the trustworthiness of the user U as well as the device, it adds the CERT-U and the IMSI-i (of the selected ticket) to REGDATA-U. The POS 504 then signs the collected information with the private portion of its signature key K-POS and sends the signed data and the signature (online or offline) to the MNO 568. The POS 504 optionally encrypts the data, using the public portion of the K-MNO.

$$\text{POS} \rightarrow \text{MNO}: \text{IMSI}_i, \text{CERT}_U, \text{REGDATA}_U; \text{SIGN}_{POS}(\text{IMSI}_i, \text{CERT}_U, \text{REGDATA}_U) \quad \text{(Equation 11)}$$

The MNO 506 checks the data and generates the subscriber-related portion of the vSIM credential using IMSI-i, the symmetrical key Ki, and the certificate CERT-U. The MNO 506 then signs this bundle with the private signature key K-MNO, and lastly, activates the signed vSIM credential and the respective NONCES in its authentication center, at 570.

The MTP 200 can then request an available registration service of the MNO 506 via an existing communication channel. This service may be implemented, for example, as a network telecommunications service or Internet service.

Figure 6:
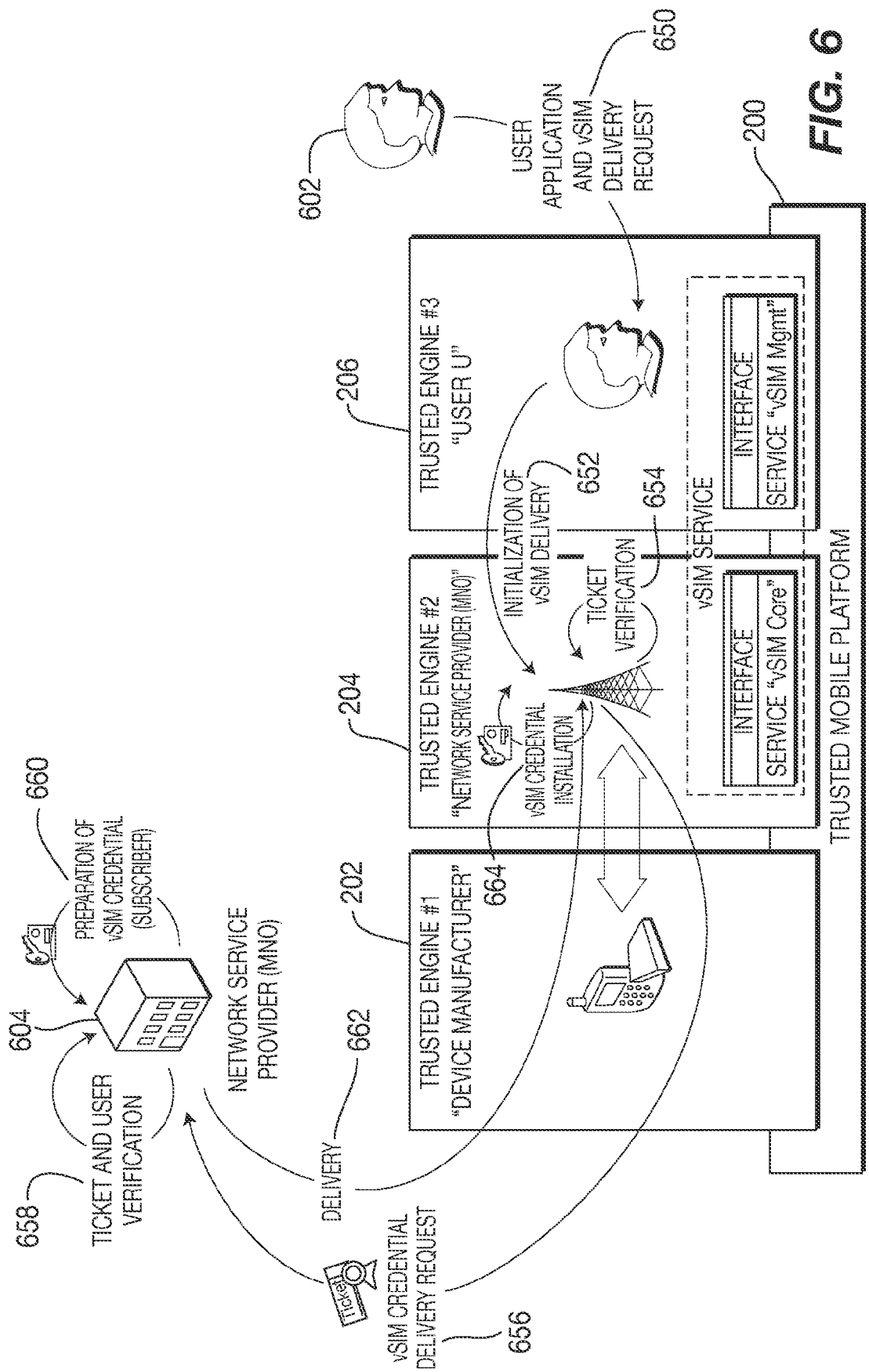
FIG. 6 shows and example of a procedure for the second phase of secure delivery and installation of the subscriber-related portion of the vSIM credential.

FIG. 6 shows an example of a procedure for the second phase of secure delivery and installation of the subscriber-related portion of the vSIM credential onto the mobile trusted platform 200 of FIG. 2. To obtain the subscriber-related portion of the vSIM credential, the user applies to the registration service of the MNO 604. For this purpose the user U 602 submits his ID-U and the associated password CHV-U to the service vSIM-MGMT. vSIM-MGMT then loads the associated key pair Ku (user-related portion of the vSIM credential) from the protected memory, at 650.

$$U \rightarrow vSIM_{MGMT}:ID_U, CHV_U \qquad \text{(Equation 12)}$$

Subsequently, the vSIM-MGMT initializes a rollout procedure, and for this purpose sends a request to vSIM-CORE, at 652.

$$vSIM_{MGMT} \rightarrow vSIM_{CORE}:\text{init\_rollout\_vsim} \qquad \text{(Equation 13)}$$

After the request message is received, the vSIM-CORE releases the respective ticket$_i$ and checks the authenticity and integrity of the ticket-i, at 654. vSIM-CORE then extracts the value NONCE-U from the ticket-i and requests U 602 to verify his identity via the vSIM-MGMT.

$$vSIM_{CORE} \rightarrow vSIM_{MGMT}:NONCE_U \qquad \text{(Equation 14)}$$

The service vSIM-MGMT signs the NONCE-U together with ID-U. This bundle is sent back to vSIM-CORE.

$$vSIM_{MGMT} \rightarrow vSIM_{CORE}:SIGN_{TSS_U}(ID_U \| NONCE_U) \qquad \text{(Equation 15)}$$

As soon as the service vSIM-CORE has received the message, it generates a vSIM credential delivery request and submits same to the assigned registration service of the MNO 656. For this purpose the service vSIM-CORE extracts the NONCE-MNO from the ticket-i and signs it together with IMSI-i. vSIM-CORE then sends its generated signature and the received user signature, via some quarantine channel or the internet, to the MNO 656.

$$vSIM_{CORE} \rightarrow MNO:SIGN_{TSS_{MNO}}(IMSI_i \| NONCE_{MNO})$$
$$SIGN_{TSS_U}(ID_U \| NONCE_U) \qquad \text{(Equation 16)}$$

After the request from the vSIM CORE is received, the MNO 604 checks the messages, the CERT-U, and the Cert-TSS-MNO (with verification either based on the received data or from the local memory or a certificate provided by the POS (not in picture)), at 658. If the information is invalid or is rejected, the MNO 604 replies with an error message and terminates the protocol. The NONCE$_{MNO}$ and NONCE$_U$, both extracted from the ticket, are simply challenges to the MNO 604 and U 602 respectively. They are not used for freshness, instead, freshness can be achieved in various ways, for instance by adding timestamps of suitable granularity in the messages.

In another scenario, the request is approved by the MNO 604. The MNO then prepares the subscriber-related portion of the vSIM credential for transmission to the vSIM-CORE. The MNO 604 generates a randomly selected session key Ks. The key Ks together with the corresponding key from the TSS-MNO 204 are then linked to the target platform, at 660, so that the data (in this case, the key Ks) may be used only by an associated authorized entity. The MNO 604 encrypts the subscriber-related portion of the vSIM credential together with the session key, and sends both to the TSS-MNO 204, at 662.

$$MNO \rightarrow *vSIM_{CORE}:ENC_{K_s}(Cred_{vSIM} \| SIGN_{MNO}$$
$$(Cred_{vSIM})) \qquad \text{(Equation 17a)}$$

$$BIND_{TSS_{MNO}}(K_s) \qquad \text{(Equation 17b)}$$

Lastly, the TSS-MNO 204 releases the session key Ks. With this key the TSS-MNO 204 decrypts the subscriber-related portion of the vSIM credential and checks the accompanying signature. When the decryption has been successfully performed and verified, the vSIM-CORE seals the received vSIM credential on one or more valid platform configurations. The vSIM-CORE then ends the procedure and concludes the installation, at 664.

Alternatively, the MNO 604 could generate the separated key Ks and incorporate an encrypted subscriber-related portion of the vSIM credential in the ticket-i. In this case, the MNO 604 sends only the key Ks to the vSIM-CORE of the target platform, at 662.

Figure 7:
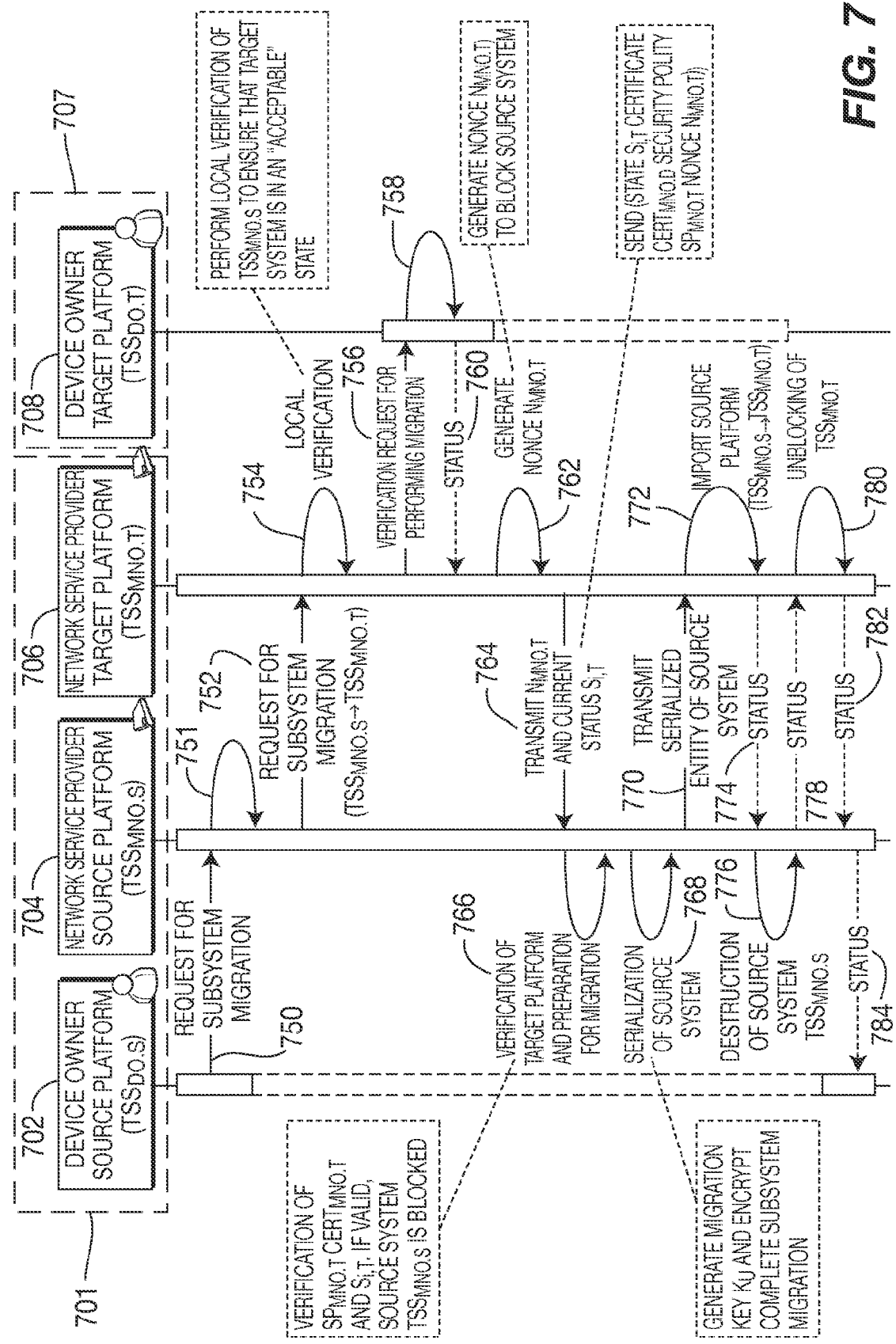
FIG. 7 shows an example of a procedure for migrating vSIM credential or its execution environment from a source platform to target platform.

FIG. 7 shows an example of a procedure for migrating vSIM credential or its execution environment from a source platform 701 to a target platform 707. The procedure is performed between a source platform 701 including a TSS-DO.s 702, and a TSS-MNO.s 704, and a target platform 707 including TSS-MNO.t 706 and a TSS-DO.t 708. All security-sensitive data including the storage root keys (SRK) are migrated to the target TSS-MNO.t. This requires the same remote owner (RO) on both subsystems TSS-MNO.s and TSS-MNO.t.

The migration procedure of FIG. 7 provides that a complete key hierarchy (1) may be migrated between execution environments of identical stakeholders (2) when and only when for this purpose a specific security policy exists on both platforms and is authorized. The constraints for migration require that only one MNO be involved; however, the credentials can be migrated from one subsystem to another with different owners. The verification that the stakeholder are identical can be performed by the source and destination entities through the attestation mechanism. The configuration transfer can be generalized such that only credentials and policies excluding the software suite are migrated from one platform to another, making the migration independent of functionality.

The procedure begins when TSS-DO.s 702 sends a request for subsystem migration to the TSS-MNO.s 704, at 750. The TSS-MNO.s 704 performs checks on whether the service level of the user and contractual relationship with the target MNO allow the migration at 751. Then the TSS-MNO.s 704 sends a request for subsystem migration (TSS-MNO.s-→TSS-MNO.t) to the TSS-MNO.t 706, at 752. Then the TSS-MNO.t 706 performs a local verification of TSS-MNO.s 704 to ensure that the target platform 707 is in an acceptable state, at 754. The TSS-MNO.t then sends a verification request for performing migration to the TSS-DO.t 708, at 756. The TSS-DO.t708 performs a confirmation, at 758. Upon successful verification, the TSS-DO.t 708 sends a status message to the TSS-MNO.t 706, at 760. Then the TSS-MNO.t 706 generates a NONCE $N_{mno.t}$, at 762. The TSS-MNO.t 706 sends $N_{mno.t}$ and current status $S_{i,t}$ to TSS-MNO.s 704, at 764. Then the TSS-MNO.s 704 performs a verification of the platform and prepares it for migration at 766. Upon a successful verification, the TSS-MNO.s 704 performs a serialization of the source platform 701, at 768. Then the TSS-MNO.s 704 sends a message containing a serialized entity of the source subsystem TSS-MNO.s to the TSS-MNO.t 706, at 770. The TSS-MNO.t imports the source subsystem, at 772. Then the TSS-MNO.t sends a status message to the TSS-MNO.s 704, at 774. The TSS-MNO.s destroys the TSS-MNO.s, at 776.

While FIG. 7 shows a specific implementation of a migration procedure, the following section describes a more general procedure with a similar end point as the procedure of FIG. 7. For this purpose the device owner starts the migration service of the TSS-MNO-S.

$$DO_S \rightarrow TSS_{MNO.S}:\text{init\_migrate\_vsim}$$

$$DO_S \rightarrow TSS_{MNO.S}:\text{init\_migrate\_vsim} \qquad \text{(Equation 18)17b)}$$

This service provides the following basic functions. The platform MTP.s (or TSS-DM) is assigned by the migration service of the TSS-MNO.s to develop a secure channel (for example TLS and where the communication technology might be Bluetooth, WLAN, USB, etc) to the target platform MTP.t.

After the connection is available, the TSS-MNO.t activates the respective migration service in the TSS-MNO.t to perform the import procedure.

Attestation data of TSS-MNO.s is sent to TSS-MNO.t using the secure channel $$TSS_{MNO,S} \rightarrow TSS_{MNO,D}: ATTEST_{TSS_{MNO,T}}(S_i)$$

$$TSS_{MNO,S} \rightarrow TSS_{MNO,D}: ATTEST_{TSS_{MNO,T}}(S_i) \quad \text{(Equation 19)}$$

The target subsystem TSS-MNO.t then performs a local check of the TSS-MNO.s. If the configuration attestation information, received in 752, is invalid, TSS-MNO.t replies with an error message and terminates the protocol. In the other case, the TSS-MNO.t requests confirmation by the local owner DO.

The target subsystem TSS-MNO-D then generates a random value NONCE-MNO.t. To provide proof of its trustworthiness, the TSS-MNO.t sends all necessary information to the source subsystem TSS-MNO.s. This includes the current status of the Si,t, the certificate of TSS-MNO.t, the security policy SP-MNO.t, and the value NONCE-MNO.t.

$$TSS_{MNO,T} \rightarrow TSS_{MNO,S}: S_{i,T}, Cert_{TSS_{MNO,T}}, \quad \text{(Equation 20)}$$
$$SP_{MNO,T}, NONCE_{MNO,T}$$
$$TSS_{MNO,T} \rightarrow TSS_{MNO,S}: S_{i,T}, Cert_{TSS_{MNO,T}},$$
$$SP_{MNO,T}, NONCE_{MNO,T}$$

After the message from the target subsystem is received, the TSS-MNO.s checks the status of TSS-MNO.t. If the target system is in a trusted status and performs an acceptable security policy and configuration, the current status of TSS-MNO.s is linked to the value NONCE-MNO.t and all further actions are halted, thereby deactivating the TSS-MNO.s. It is noted that, where applicable, the source system submits suitable data to reactivate the target system.

The TSS-MNO.s generates a symmetrical migration key K-M, serializes its entity, and encrypts it with the K-M. The K-M is linked to an acceptable configuration of the TSS-MNO.t.

The linked key K-M and the encrypted entity are then sent to the target platform TSS-MNO.t. This includes in particular the completely insulated key hierarchy K-MNO.s together with SRK-MNO.s, the security policy SP-MNO.s, and the required SC-MNO.s.

$$TSS_{MNO,S} \rightarrow TSS_{MNO,T}: BIND_{TSS_{MNO,S}}(K_M), \quad \text{(Equation 21a)}$$
$$ENC_{K_M}(K_{MNO,S}, SP_{MNO,S}, SC_{MNO,S})$$
$$TSS_{MNO,S} \rightarrow TSS_{MNO,T}: BIND_{TSS_{MNO,T}}(K_M)$$
$$ENC_{K_M}\begin{pmatrix} K_{MNO,S}, SP_{MNO,S}, \\ SC_{MNO,S}, NONCE_{MNO,T} \end{pmatrix} \quad \text{(Equation 21b)}$$

Lastly, the target subsystem TSS-MNO.t decrypts the received K-M and uses SRK-MNO.s as its own SRK. The subsystem checks the received security policy SP-MNO.s and the subsystem configuration SC-MNO.s. With this information the TSS-MNO.t then forms the internal structure of the source subsystem.

After the TSS-MNO.t is successfully completed, the target platform transmits a status report and, where applicable, transmits a platform attestation to the source system.

The source platform TSS-MNO.s deletes all security-sensitive data or renders them permanently unusable. The source system then transmits a status report, if applicable, to the target system and/or performs a platform attestation.

Figure 8:
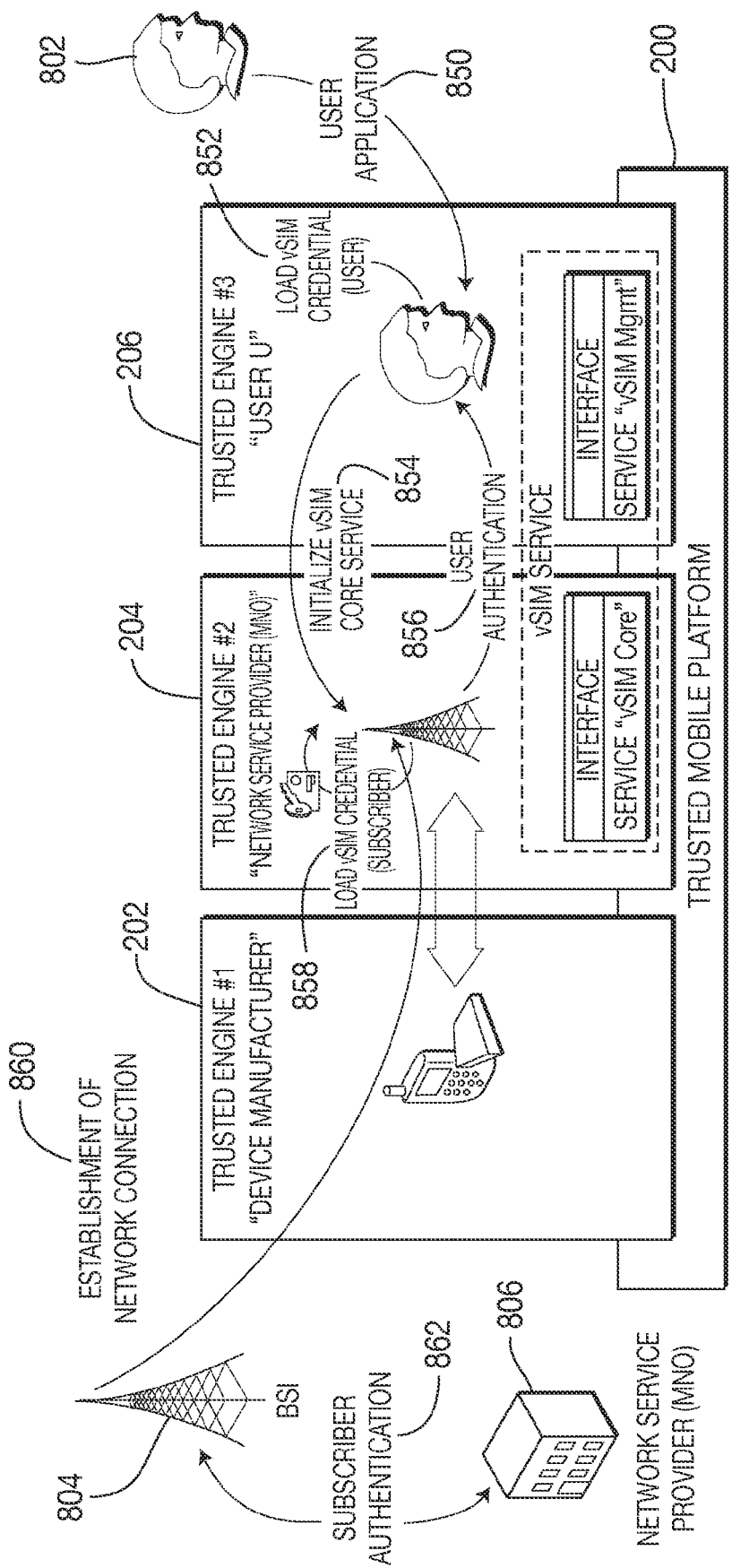
FIG. 8 shows an example of a communication system configured to perform a first procedure for allowing access of a communication subscriber.

FIG. 8 shows an example of a communication system configured to perform a first procedure for allowing access of a communication subscriber 802 to a cell based communication network using the software based authorization credentials of the trusted mobile platform 200 of FIG. 2. The approach of FIG. 8 allows access of a communications subscriber 802 to a wireless communications network using software-based access authorization credentials.

The primary objective of the virtual software-based access authorization credential is to ensure a functional substitute for a conventional security token (SIM card) for subscriber authentication in wireless communications networks. In addition to the primary objective of offering a substitute for the conventional SIM function, this procedure links the access authorization credential to a specified trusted platform configuration.

All subscriber-related methods are carried out within the TSS-MNO and by use of the service vSIM-CORE. While algorithms for the GSM standards A3 and A8 are shown below for purposes of example, similar techniques could be used with authentication algorithms of other wireless technologies as well. In the example presented below, these algorithms are responsible for the subscriber authentication and key generation. The algorithm A5/3 for securing the communications channel is integrated within TSS-DM.

Before the procedure of FIG. 8 begins, it is assumed the MTP 200 has performed an initial startup process and loaded the trusted operating system and trusted services. This procedure in particular includes the instantiation of the services vSIM-CORE and vSIM-MGMT. The trustworthiness of the platform is checked so that the installed hardware and running software are in a trusted state and configuration. The MTP is able to report and certify this state when queried by an authorized entity.

The procedure is divided into two phases. Phase 1 constructs the protocol for initializing the services vSIM-CORE and vSIM-MGMT. Subscriber authentication, for example, is performed in Phase 2, taking the GSM standard by way of example into account and using a vSIM credential to carry out the authentication algorithm without changes to the authentication protocol messages, which take place between the MNO and the device.

Phase 1 begins when the local user initializes the vSIM service and performs an authentication. For this purpose the user 802 sends their unambiguous identifier ID-U, together with the correct password CHV-U, to the vSIM-MGMT service, at 850.

The service vSIM-MGMT checks the transmitted user data, and if the check is successful loads the respective identity credential (user-related portion of the vSIM credential) from the protected storage area, at 852. The identity credential contains in particular the signature key of the user U 802.

$$U \rightarrow vSIM_{MGMT}: ID_U, CHV_U \quad \text{(Equation 2)}$$

The service vSIM-MGMT then connects to the trusted interface of the service vSIM-CORE and sends an initialization request to vSIM-CORE, at 854. After vSIM-CORE has received this request it generates a random value RAND-AUTH and sends this value as an authentication message to the service vSIM-MGMT, at 856.

$$vSIM_{CORE} \rightarrow vSIM_{MGMT}:RAND_{AUTH} \quad \text{(Equation 23)}$$

The service vSIM-MGMT uses the respective private portion of the signature key of the user U, signs the authentication message RAND-AUTH, and sends this value back to the service vSIM-CORE $$vSIM_{MGMT} \rightarrow vSIM_{CORE}:SIGN_U(RAND_{AUTH}) \quad \text{(Equation 24)}$$

As soon as vSIM-CORE has received the signed message it checks the message status. After a successful check, the service vSIM-CORE decrypts the subscriber-related portion of the vSIM credential and initializes the GSM algorithms A3 and A8 For initialization, vSIM-CORE uses the subscriber data IMSI-i and Ki of the vSIM credential, at 858.

Phase 2 begins, when the vSIM-CORE communicates indirectly (via the TSS-DM) with the MNO. The communication between the involved communication parties occurs transparently. For this purpose the TSS-DM 202 must provide suitable methods or services which relay these messages between the service vSIM-CORE and the MNO 806.

The following protocol sequence represents the vSIM-based authentication method in GSM networks, and is provided only as an example. First the MTP initializes the authentication method, and for this purpose sends the command GSM_AUTH_ALGORITHM to the service vSIM-CORE of the TSS-MNO.

In the next step, the MTP 200 establishes access to the network 806 via the TSS-DM, at 860. Now, subscriber authentication is performed 862 according to the following procedure. For this purpose the TSS-MNO 204 sends the identifier IMSI-i (or TMSI-i) to the MNO.

$$vSIM_{CORE} \rightarrow MNO:IMSI_i \quad \text{(Equation 25)}$$

The MNO 806 internally generates a series of authentication triplets. These triplets contain an authentication request RAND-i, a temporary session key Kc, and the expected authentication response SRES. The Kc and the SRES are computed using the GSM A3/A8 algorithm. The MNO 806 replies to the MTP 200 with the authentication request RAND-i.

$$MNO \rightarrow vSIM_{CORE}:RAND_i \quad \text{(Equation 26)}$$

The RAND-i is relayed by the TSS-DM 202 to the service vSIM-CORE of the TSS-MNO. The vSIM-CORE then uses the A3 algorithm together with the key Ki. The result of the A3 algorithm is the authentication response SRES*.

The vSIM-CORE sends this message SRES* to the MNO.

$$vSIM_{CORE} \rightarrow MNO:SRES^* \quad \text{(Equation 27)}$$

Lastly, the MNO compares the SRES to SRES*. If these are identical, the subscriber is considered to be authenticated. The vSIM-CORE and MNO deduce the shared session key Kc and transmit Kc to the TSS-DM. The TSS-DM then accepts Kc for establishing a secure communications channel.

Figure 9:
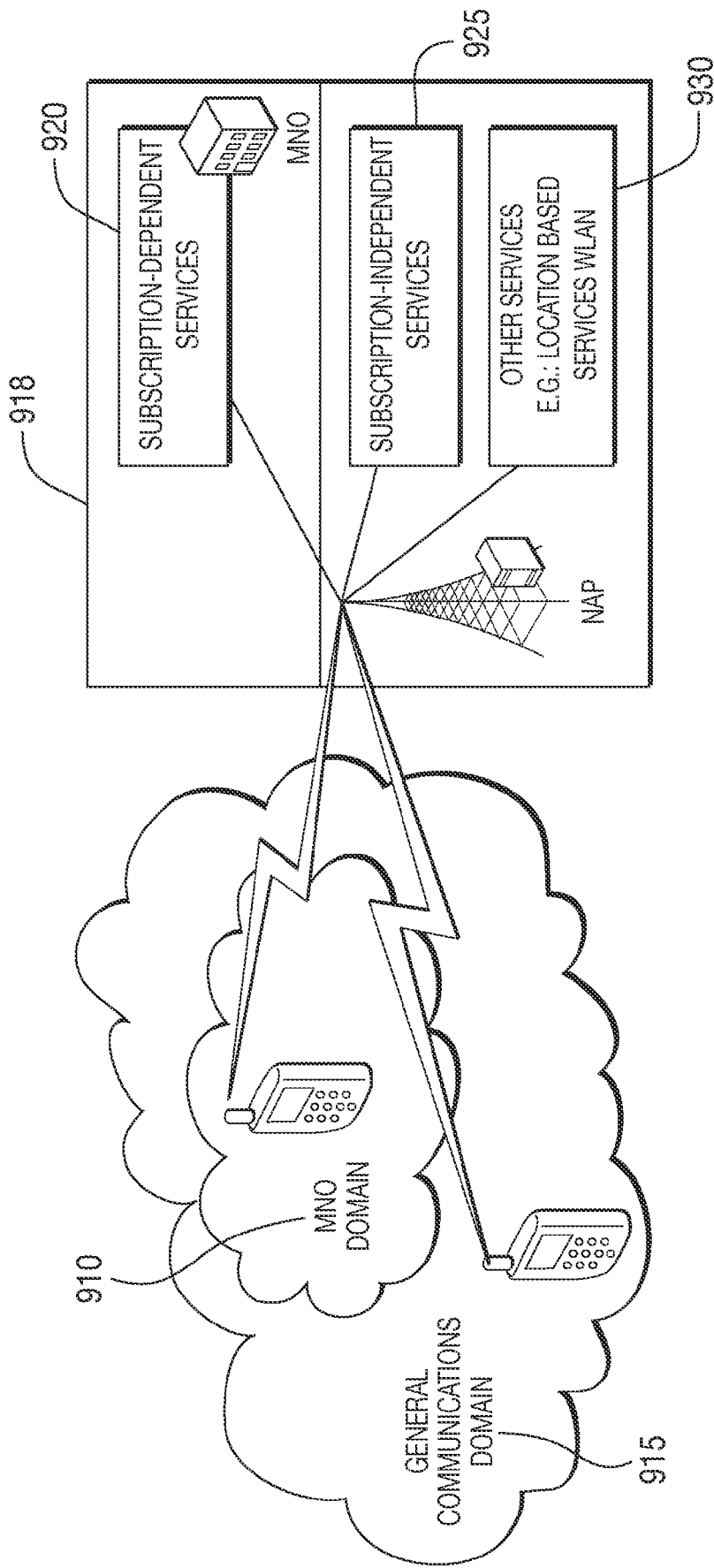
FIGS. 9 show an example of a communication system configured to perform a second procedure for allowing access of a communication subscriber.
Figure 10:
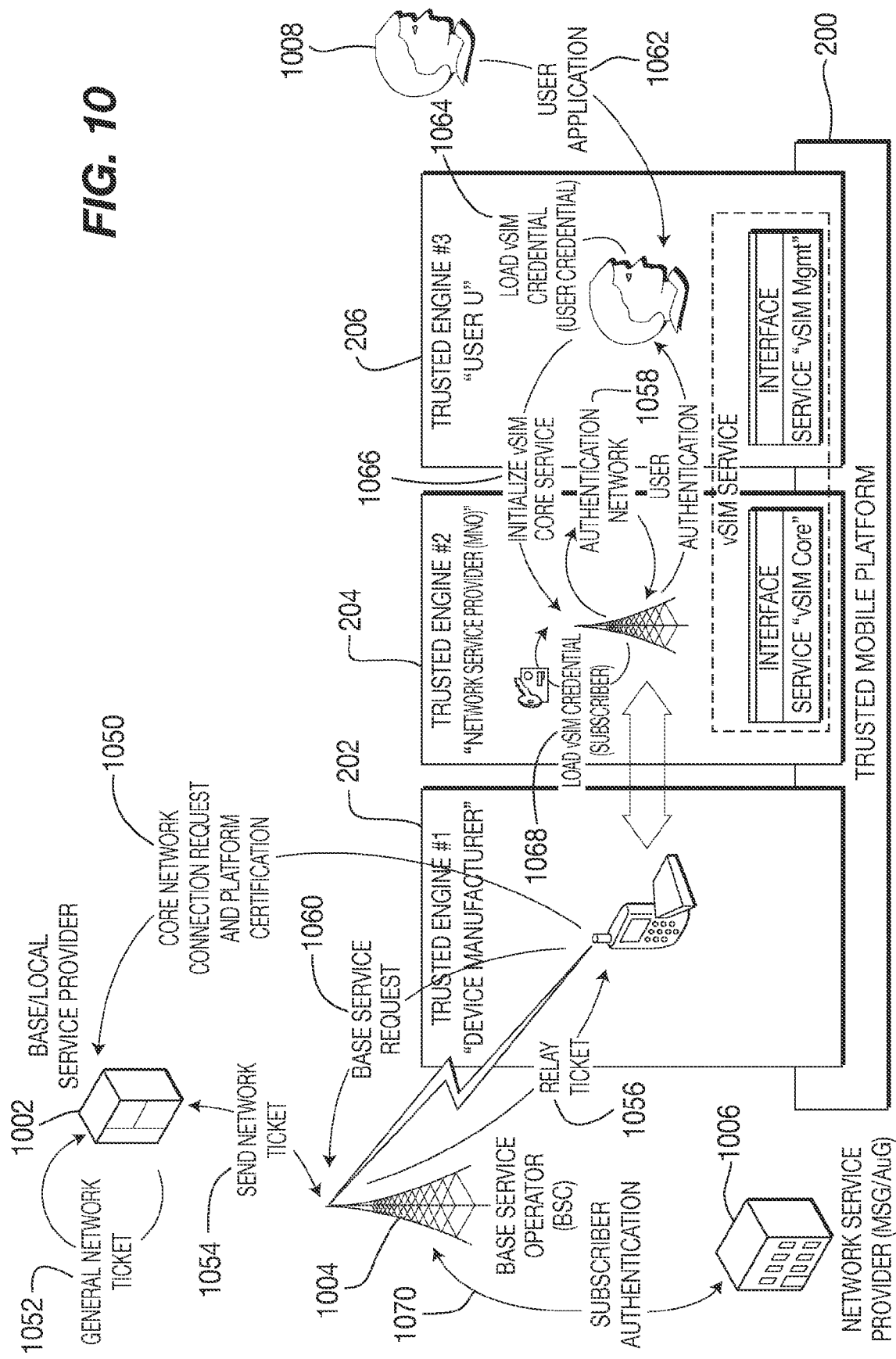
FIGS. 10 show another example of a communication system configured to perform a second procedure for allowing access of a communication subscriber.

FIGS. 9 and 10 show an example of a communication system configured to perform a second procedure for allowing access of a user to a cell based communication network using remote attestation of the trusted mobile platform 200 of FIG. 2. In FIG. 9, there is a general communication domain 910, and a smaller MNO domain 915 which lies completely within the bounds of the general communications domain 910. The network 918, also includes separate subscription-dependent services 920 which are related to the MNO, subscription-independent services 925, and other services 930 such as location based services and/or wireless local area networks (WLAN).

In comparison to the procedure of FIG. 8, this second procedure uses the technological possibilities of platform attestation for ensuring access to the network in order to use free or optional services that are subscription-independent and/or non-subscriber-related, such as public services.

In addition to the primary objective of offering a substitute for the conventional SIM functions, the second procedure links the access authorization credential to a specified trusted platform configuration, and provides a mutual authentication between the MNO and the MTP. In addition, the second procedure provides core network access to subscription-independent and/or non-subscriber-related services in a general communications domain, fine-grained function limitations such as SIM lock, and dynamic downgrade/upgrade of services.

As shown in FIG. 9, all devices within a generally accessible communications domain are able to use or access subscription-independent and/or non-subscriber-related services (with respect to the MNO) of the core network. Such services may be, for example, location-based services or WLAN-based Internet access. For the case that a mobile telephone is associated with the general communications domain, the mobile telephone uses attestation mechanisms to obtain access to the core network.

The transition to the subscriber-authenticated region (subscription-dependent MNO services) of the MNO requires successful completion of subscriber authentication by use of a vSIM credential. An MTP thus has access to services within the region of the specific communications services offered by the MNO (GSM, UMTS, etc.), as well as access to the services offered by the core network.

FIG. 10 shows an example of the second procedure for allowing access of a communication subscriber to a cell based communication network using remote certification of the MTP 200 of FIG. 2. Before the procedure may begin it is assumed that the MTP 200 has performed an initial startup process and loaded the trusted operating system and trusted services. This procedure in particular includes the instantiation of the services vSIM-CORE and vSIM-MGMT. The trustworthiness of the platform is checked so that the installed hardware and running software are in a trusted state and configuration. The MTP 200 is able to report and certify this state when queried by an authorized entity.

The procedure shown in FIG. 10 is divided into three phases. The first phase of the procedure describes the access to the core network. The procedure uses platform certification and ticketing mechanisms. In the second phase the vSIM credential is initialized. Lastly, the third phase implements the method for subscriber authentication.

Phase 1 begins when the MTP 200 initializes the base authentication of the device. For this purpose the trusted execution environment TSS-DM 202 directs a platform attestation and device authentication to the MNO 1006. The TSS-DM 202 then performs this request and connects to the respective network access point (NAP-MNO), at 1050. For this purpose the TSS-DM 202 generates a random value RAND-BASE and performs a platform attestation. The base authentication service then sends the execution environment TSS-DM 202 the value RAND-BASE, the attestation data, and its certificate Cert-DM to the network access point NAP-MNO.

$$TE_{DM} \rightarrow NAP_{MNO}:RAND_{BASE},Cert_{TSS_{DM}},ATTEST(S_i) \quad \text{(Equation 28)}$$

As soon as this request is received by the NAP-MNO, the NAP-MNO checks the status of the MTP 200. In the event that the integrity check fails or no accepted reference state is found, the NAP-MNO terminates the protocol and replies with an error message. If the certification of the platform is successful, the MTP 200 is considered to be trustworthy.

An accredited entity of the NAP-MNO then generates a network ticket together with a session key K-BASE 1052. Such an entity may be, for example, an authentication center (AUC-MNO) which is a part of the mobile network provider MNO. K-BASE is a minimally used session key which establishes a tunnel between the MTP and the NAP-MNO. This tunnel can be used to protect the distribution of traffic-oriented keys that perform the bulk of the data encryption workload. The selection of this key is made by an authentication trusted third party.

The ticket essentially contains the following information, where REALM identifies the PLMN entity (AuC, VLR, HLR, etc.) involved in the direct communication with the device and LIFETIME a ticket expiration value:

$$\text{Ticket}_{BASE} := \{ID_{MTP}, ID_{NAP}, REALM_{BASE}, LIFETIME_{BASE}\} \quad \text{(Equation 29)}$$

The AUC-MNO then encrypts the ticket-BASE, using the public (or, where applicable, the shared) key K-NAP, and also encrypts K-BASE, and sends both to the NAP-MNO, at 1054. The NAP-MNO relays the information to the client platform, at 1056. The message is also linked to a trusted subsystem TSS-DM 202 together with the respective public key K-TSS-DM and a valid platform configuration.

$$AUC_{MNO} \rightarrow TSS_{DM} : BIND_{K_{TSS_{DM}}}(K_{BASE}), \quad \text{(Equation 30a)}$$

$$ENC_{K_{NAP}}(\text{Ticket}_{BASE}), \quad \text{(Equation 30b)}$$

$$SIGN_{AUC_{MNO}}(RAND_{BASE}) \quad \text{(Equation 30c)}$$

As soon as the TSS-DM 202 has received the signed message, it checks the status of the signed value RAND-BASE, at 1058. If the information is invalid or is rejected, the subsystem replies with an error message and terminates the protocol. In another case, the AUC-MNO is certified by the authentication response.

The TSS-DM 202 then decrypts the session key K-BASE and sends the encrypted data together with an authenticator (MTP) to the NAP-MNO. In the present case the authenticator (MTP) is composed of the platform identity ID-MTP, the current network address ADDR, and a time stamp TIME.

$$TSS_{DM} \rightarrow NAP_{MNO}:ENC_{K_{NAP}}(\text{Ticket}_{BASE}), A_{MTP}$$

$$BIND_{K_{NAP}}(K_{BASE}) \quad \text{(Equation 31)}$$

The ticket base TicketBAsE is simply passed by TSSDM to the network where it is decrypted. When the NAP-MNO has received the encrypted ticket, it verifies the embedded information. If the status is valid, the platform is certified and access to the general services is granted. The limited use session key K-BASE is now bound to both the MTP 200 and the NAP-MNO to setup the secure tunnel between the two entities.

The procedure of Phase 2 is similar to 850-858 of in the procuedure of FIG. 8.

There are two options for completing phase three, the first option performs subscriber authentication with compatibility to the GSM standard, by way of example. In an additional step the key K-BASE is replaced by the session key Kc on the side of the NAP-MNO and of the MTP, at 1070.

At this point, a mutual authentication is performed between the AUC-MNO and U. The AUC-MNO is certified by a signed authentication request, at 1056. On the other side, the user 1008 verifies his identity by means of SRES. The authentication between the NAP-MNO and U 1008 is implicitly verified by a valid message key Kc.

This method may be optimized by embedding RAND-i beforehand in the encrypted key message, at 1056. In this case, vSIM-CORE extracts the RAND-i from this message, computes the authentication response SRES, and sends both results to the MNO. The MNO internally generates the expected SRES and the corresponding session key Kc.

Additional steps must be performed when an explicit authentication of these entities is required. The NAP is certified with respect to the platform by means of the following procedure. First, the NAP removes the time stamp from the authenticator Au. The NAP then increases the value and encrypts it, using the shared session key Kc (or a key derived from same). Lastly, the PNAP sends the message back to MTP.

In the second option for phase 3 (not pictured), the authentication methods may deviate from the GSM authentication standard. This variant presents a slightly modified authentication method which, however, provides a significant increase in security for the PLMN. In particular, protocol errors in signal system 7 (SS7) may be avoided in this manner.

The following variant makes use of the former negotiated information for the core network access from phase 1. In conventional GSM infrastructures an authentication triplet is sent over the SS7 network. This triplet contains a challenge RAND, the correct response SRES, and the message key Kc.

Although the initial access to the mobile communications network is established by the message key K-BASE, renewal of this key is not necessary. This applies in particular to embedding of the session key Kc. Transmission of unprotected session keys is thereby avoided.

The basic purpose of this option is to make use of the existing communications tunnel between the NAP-MNO and the MTP which is protected on the basis of the key K-BASE. Instead of renewing the session key, the MNO sends only a service update message to the respective network access point NAP and MTP.

Figure 11B:
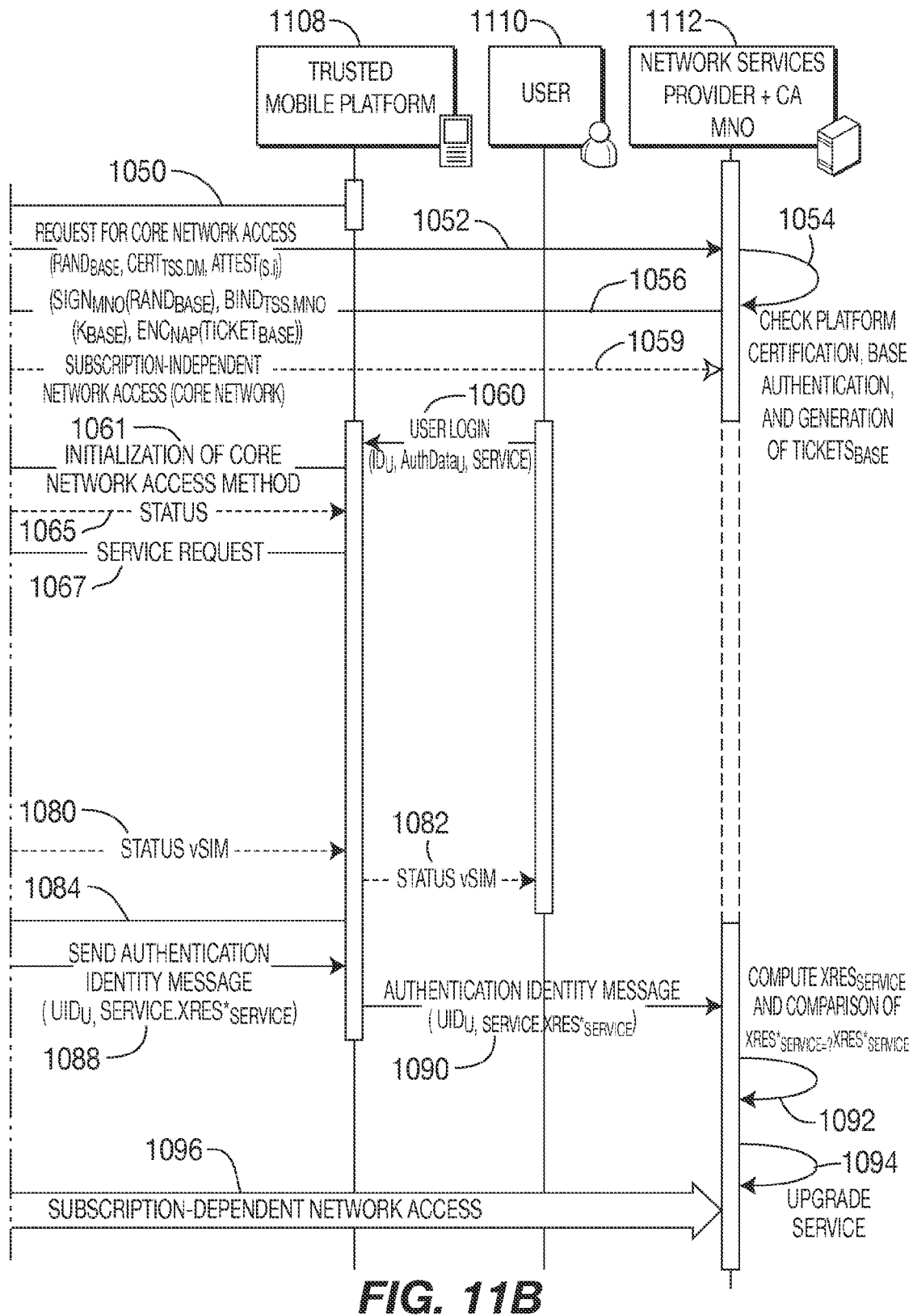
FIG. 11 shows a third procedure for allowing access of a communication subscriber for a general network infrastructure.

FIG. 11 shows a third procedure for subscriber authentication for a general network infrastructure. For the procedure of FIG. 11, the structural design of the subscriber-related portion of the vSIM credential and the functionality or integrated algorithms of the trusted service vSIM-CORE must adhere to certain requirements.

The vSIM credential of FIG. 11 is an access authorization credential based on the identity of a subject. This access authorization credential, not bound to the 2G/3G structural mold, is a generalization of its counterparts in FIGS. 8 and 10 and is used to certify the identity of a communications subscriber. The vSIM credential contains a unique identifier ID-U of the subject U 1110 and at least one information item based on cryptographic encryption mechanisms (for example, symmetrical or asymmetrical keys) or non-cryptographic encryption mechanisms (for example, one-way hash chain). Only authorized subjects are able to generate or read a vSIM credential or modify the contained information. A vSIM credential may contain additional information such as the device identity or a list of valid application areas.

The MTP 1108 instantiates a vSIM-CORE service which runs in a separate, protected execution environment. The service vSIM-CORE is responsible for the core functioning of the subscriber authentication. In particular, this service performs the actual authentication mechanisms. The specific design of mechanisms or procedures depends on the particular application. The service vSIM-CORE may import a trusted functionality, possibly based on the particular use-case, and may also provide other (external) trusted services. vSIM-CORE also contains at least one subscriber-related portion of a vSIM credential.

Before the procedure of FIG. 11 begins, the MTP 1108 has performed an initial startup process and loaded the trusted operating system and trusted services. These contain in particular the instantiation of the services vSIM-CORE and vSIM-MGMT. The trustworthiness of the platform is checked so that the installed hardware and running software are in a trusted state and configuration. The MTP is able to report and certify this state when queried by an authorized entity.

The procedure of FIG. 11 is divided into three phases. Phase one 1120 is remote certification. Phase two 1130 is the initialization of the vSIM credential. Phase three 1140 is the subscriber authentication procedure.

In phase one 1120, platform certification is used to perform a device-authentication, as described by way of example above. In this general case provided in FIG. 11, the network entity MNO 1112 is replaced by a respective entity of the general network infrastructure. Such an entity may be, for example, an authentication server (ALS) within this network, where the server is not necessarily tied to 2G or 3G technology but could apply to future networks such as long term evolution (LTE).

Phase two 1130, the initialization of the vSIM services and of the vSIM credential is performed in a similar manner as the phase two procedure of FIG. 10. However, the procedure is based on generalized assumptions, thus enabling a broader basis for further authentication methods and protocols.

Phase three 1140 is the subscriber authentication procedure for authenticating and authorizing a given subscriber for services offered by the ALS. In contrast, the procedures of FIGS. 8 and 10 are limited to procedure for subscriber authentication of shared secret information (symmetrical key Ki as per GSM). In particular, this limitation is not present in the generic procedure of FIG. 11. Thus, in the procedure of FIG. 11, no shared secret is employed and the authentication process is entirely based on certificate based asymmetric cryptography. For example, using Diffie-Hellman with a certificate authority (CA), a key exchange can take place between trusted entities. In such a scenario the parties require mutual identity with verification by the CA.

In phase three 1140, a random value RAND-SRV is used to request an expansion of services on the ALS. The TE-MNO extracts the RAND-SRV from the ticket-BASE. The TSS-MNO then produces the authentication response XRES*-SRV and signs the RAND-SRV with its private signature key K-priv-TM-AS. Together with UID and a service identifier SRV this signature XRES*-SRV is sent to the ALS As soon as the ALS has received this message, it verifies the signature of the XRES*-SRV. If the signature is valid, the platform is certified and a service expansion is performed.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. In a wireless transmit/receive unit (WTRU) that comprises a first trusted subsystem, a second trusted subsystem, and a third trusted subsystem, a method comprising:
storing and providing, by the first trusted subsystem credentials related to a manufacturer of the WTRU;
sending by the first trusted subsystem, a certificate and a request for a mobile network operator to take control of an execution environment of the WTRU, the certificate installed by the execution environment so as to establish the second trusted subsystem of the WTRU such that the second trusted subsystem of the WTRU is controlled by the mobile network operator; storing and providing, by the second trusted subsystem, credentials related to the mobile network operator; and storing and providing, by the third trusted subsystem, credentials related to a user of the WTRU, wherein the first trusted subsystem, the second trusted subsystem, and the third trusted subsystem are separate and insulated on the WTRU from one another such that their respective credentials cannot be accessed by the other trusted subsystems, and wherein the second trusted subsystem and the third trusted subsystem are configured to communicate with each other through a trusted virtual subscriber identity module (vSIM) service link.

2. The method of claim 1, the method further comprising:
storing and providing, by a virtual subscriber identity module (vSIM) core services unit within the second trusted subsystem, credential information relating to the mobile network operator.

3. The method of claim 1, the method further comprising:
storing and providing, by a virtual subscriber identity module (vSIM) management unit within the third trusted subsystem, credential information relating to the user of the WTRU.

4. The method of claim 1 further comprising: storing and providing, by a fourth trusted subsystem being separate and insulated on the WTRU from the first trusted subsystem, the second trusted subsystem, and the third trusted subsystem, credentials relating to a second user of the WTRU.

5. The method of claim 1 further comprising:
storing and providing, by a fourth trusted subsystem being separate and insulated from the first, second, and third trusted subsystems, credentials related to an owner of the WTRU.

6. The method of claim 1 further comprising: storing and providing, by a fourth trusted subsystem being separate and insulated on the WTRU from the first trusted subsystem, the second trusted subsystem, and the third trusted subsystem, credentials related to a remote stakeholder.

7. The method of claim 1, wherein the first trusted subsystem comprises a device manufacturer trusted subsystem (TSS-DM), wherein the second trusted subsystem comprises a remote mobile network operator (MNO) trusted subsystem (TSS-MNO), and wherein the third trusted subsystem comprises a device user trusted subsystem (TSS-U).

8. A wireless transmit/receive unit (WTRU) comprising a first trusted subsystem, a second trusted subsystem, and a third trusted subsystem, the WTRU further comprising:
a memory comprising executable instructions; and
a processor in communication with the memory, the instructions, when executed by the processor, cause the processor to effectuate operations comprising:
storing and providing, by the first trusted subsystem, credentials related to a manufacturer of the WTRU;
sending by the first trusted subsystem, a certificate and a request for a mobile network operator to take control of an execution environment of the WTRU, the certificate installed by the execution environment so as to establish the second trusted subsystem of the WTRU such that the second trusted subsystem of the WTRU is controlled by the mobile network operator;
storing and providing, by the second trusted subsystem, credentials related to the mobile network operator; and
storing and providing, by the third trusted subsystem, credentials related to a user of the WTRU,
wherein the first trusted subsystem, the second trusted subsystem, and the third trusted subsystem are separate and insulated on the WTRU from one such that their respective credentials cannot be accessed by the other trusted subsystems, and wherein the second trusted subsystem and the third trusted subsystem are configured to communicate with each other through a trusted virtual subscriber identity module (vSIM) service link.

9. The WTRU of claim 8, wherein the processor is further configured to execute the instructions to perform operations comprising:
storing and providing, by a virtual subscriber identity module (vSIM) core services unit within the second trusted subsystem, credential information relating to the mobile network operator.

10. The WTRU of claim 8, wherein the processor is further configured to execute the instructions to perform operations comprising:
storing and providing, by a virtual subscriber identity module (vSIM) management unit within the third trusted subsystem, credential information relating to the user of the WTRU.

11. The WTRU of claim 8, wherein the WTRU further comprises a fourth trusted subsytem that is separate and insulated on the WTRU from the first trusted subsystem, the second trusted subsystem, and the third trusted subsystem, and wherein the processor is further configured to execute the instructions to perform operations comprising:
storing and providing, by the fourth trusted subsystem, credentials relating to a second user of the WTRU.

12. The WTRU of claim 8, wherein the WTRU further comprises a fourth trusted subsytem that is separate and insulated on the WTRU from the first trusted subsystem, the second trusted subsystem, and the third trusted subsystem, and wherein the processor is further configured to execute the instructions to perform operations comprising:
storing and providing, by the fourth trusted subsystem, credentials related to an owner of the WTRU.

13. The WTRU of claim 8, wherein the WTRU further comprises a fourth trusted subsytem that is separate and insulated on the WTRU from the first trusted subsystem, the second trusted subsystem, and the third trusted subsystem, and wherein the processor is further configured to execute the instructions to perform operations comprising:
storing and providing, by the fourth trusted subsystem, credentials related to a remote stakeholder.

14. The WTRU of claim 1, wherein the first trusted subsystem comprises a device manufacturer trusted subsystem (TSS-DM), wherein the second trusted subsystem comprises a remote mobile network operator (MNO) trusted subsystem (TSS-MNO), and wherein the third trusted subsystem comprises a device user trusted subsystem (TSS-U).

* * * * *